United States Patent
Viswanathan et al.

(10) Patent No.: US 10,859,704 B2
(45) Date of Patent: *Dec. 8, 2020

(54) TIME DIVISION MULTIPLEXING OF MULTIPLE WAVELENGTHS FOR HIGH RESOLUTION SCANNING TIME OF FLIGHT 3D IMAGING

(71) Applicant: Microvision, Inc., Redmond, WA (US)

(72) Inventors: P. Selvan Viswanathan, Bellevue, WA (US); Bin Xue, Mukilteo, WA (US)

(73) Assignee: Microvision, Inc., Redmond, WA (US)

(*) Notice: Subject to any disclaimer, the term of this patent is extended or adjusted under 35 U.S.C. 154(b) by 392 days.

This patent is subject to a terminal disclaimer.

(21) Appl. No.: 15/865,115

(22) Filed: Jan. 8, 2018

(65) Prior Publication Data

US 2019/0212451 A1 Jul. 11, 2019

(51) Int. Cl.
*G01S 17/89* (2020.01)
*G01S 7/4865* (2020.01)
*G01S 7/4861* (2020.01)
*G01S 7/486* (2020.01)
*G01S 7/481* (2006.01)
*G01S 17/10* (2020.01)

(52) U.S. Cl.
CPC .......... *G01S 17/89* (2013.01); *G01S 7/4815* (2013.01); *G01S 7/4861* (2013.01); *G01S 7/4865* (2013.01); *G01S 7/4868* (2013.01); *G01S 17/10* (2013.01)

(58) Field of Classification Search
CPC ...... G06F 3/017; G06F 3/0325; G06F 3/0423; H04N 9/3194; H04N 9/3173; H04N 9/3129; G02B 27/141; G03B 17/54
See application file for complete search history.

(56) References Cited

U.S. PATENT DOCUMENTS

| | | | |
|---|---|---|---|
| 9,791,557 B1 | 10/2017 | Wyrwas | |
| 10,003,168 B1* | 6/2018 | Villeneuve | ............. G02B 27/10 |
| 10,222,474 B1 | 3/2019 | Raring | |
| 2006/0253512 A1* | 11/2006 | Nikitin | ..................... G06G 7/02 |
| | | | 708/400 |
| 2017/0199277 A1 | 7/2017 | Villeneuve | |
| 2017/0235429 A1* | 8/2017 | Viswanathan | .......... G06F 3/017 |
| | | | 345/175 |
| 2017/0307736 A1 | 10/2017 | Donovan | |
| 2017/0353649 A1 | 12/2017 | Yang | |
| 2018/0308881 A1* | 10/2018 | Hynecek | ............... H01L 31/107 |
| 2019/0056498 A1 | 2/2019 | Sonn | |
| 2019/0238824 A1 | 8/2019 | Lee | |

* cited by examiner

*Primary Examiner* — Luke D Ratcliffe
(74) *Attorney, Agent, or Firm* — Kevin D. Wills

(57) ABSTRACT

Laser light pulses of at least two different wavelengths are reflected off a scanning mirror. A first time-of-flight distance measurement circuit receives reflected light pulses of a first wavelength and determines distances. A second time-of-flight distance measurement circuit receives reflected light pulses of a second wavelength and determines distances. The laser light pulses of different wavelengths may be interleaved in time to increase resolution. The laser light pulses of different wavelengths may also be used for detecting safety violations and/or power control.

19 Claims, 22 Drawing Sheets

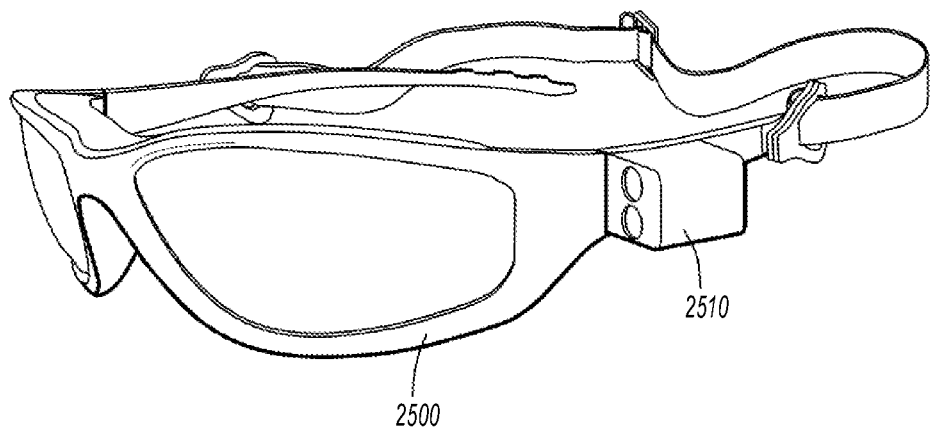
FIG. 25
FIG. 26
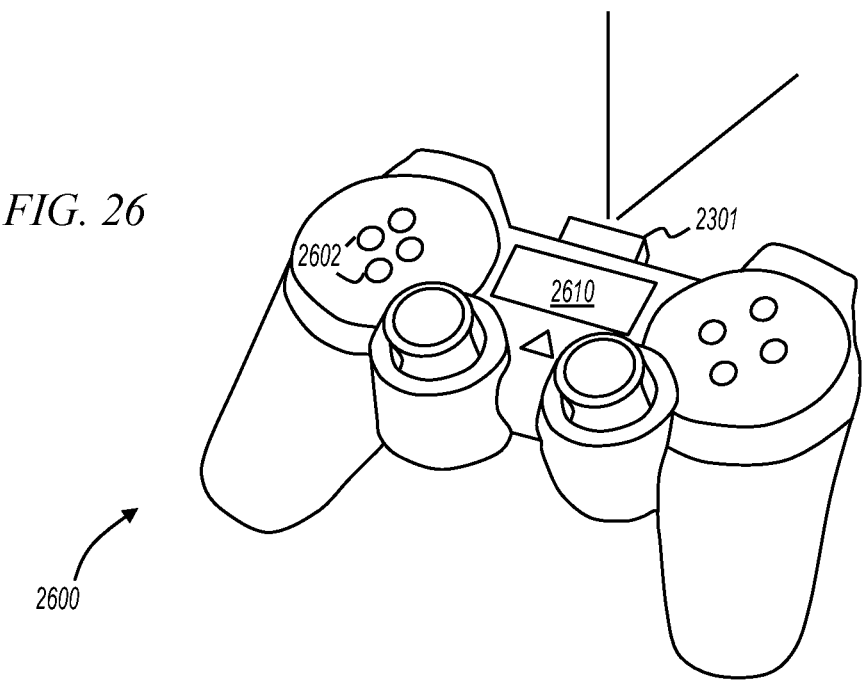

TIME DIVISION MULTIPLEXING OF MULTIPLE WAVELENGTHS FOR HIGH RESOLUTION SCANNING TIME OF FLIGHT 3D IMAGING

RELATED APPLICATIONS

This application is related to the application entitled "Scanning 3D Imaging Device with Power Control Using Multiple Wavelengths" filed on Jan. 8, 2018 with the application Ser. No. 15/865,128 and assigned to the same assignee.

FIELD

The present invention relates generally to distance measurement systems, and more specifically to laser based distance measurement systems.

BACKGROUND

Measuring time-of-flight of laser pulses for range finding is generally known, but limitations exist. For example, measurement errors result in inaccurate distance measurements.

FIG. 1 shows operation of a prior art rangefinding apparatus. Rangefinder 110 measures the distance to target 140 by sending an outgoing laser pulse 112 and receiving a return laser pulse 114 reflected by the target. The round trip time-of-flight (TOF) of the outgoing laser pulse 112 and return laser pulse 114 is measured by rangefinder 110 to determine the distance between rangefinder 110 and target 140.

A typical rangefinding system may produce a single square, triangle, or Gaussian shaped laser pulse with a pulse width in the range of two picoseconds (ps) to 10 nanoseconds (ns) full width half maximum (FWHM). The return laser pulse arrives after a round trip transit time that is a function of the distance to the target. This round trip transit time is referred to herein as "time-of-flight", or TOF. Spacing between laser pulses is typically limited by the TOF because subsequent pulses launched before the first reflected pulse is measured can corrupt the measurement process. For some measurement applications, it may be desirable to further reduce the spacing between laser pulses in a rangefinding apparatus.

BRIEF DESCRIPTION OF THE DRAWINGS

FIG. 25 shows a wearable 3D imaging system in accordance with various embodiments of the invention; and FIG. 26 shows a gaming apparatus in accordance with various embodiments of the present invention.

DESCRIPTION OF EMBODIMENTS

Figure 1:
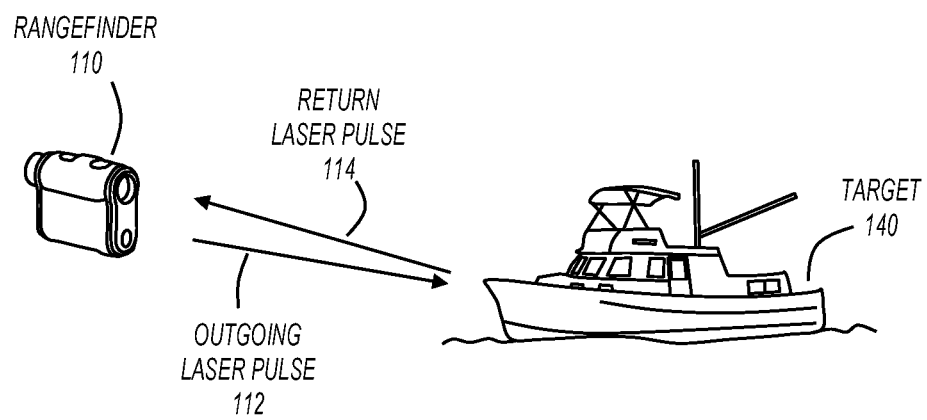
FIG. 1 shows operation of a prior art rangefinding apparatus.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
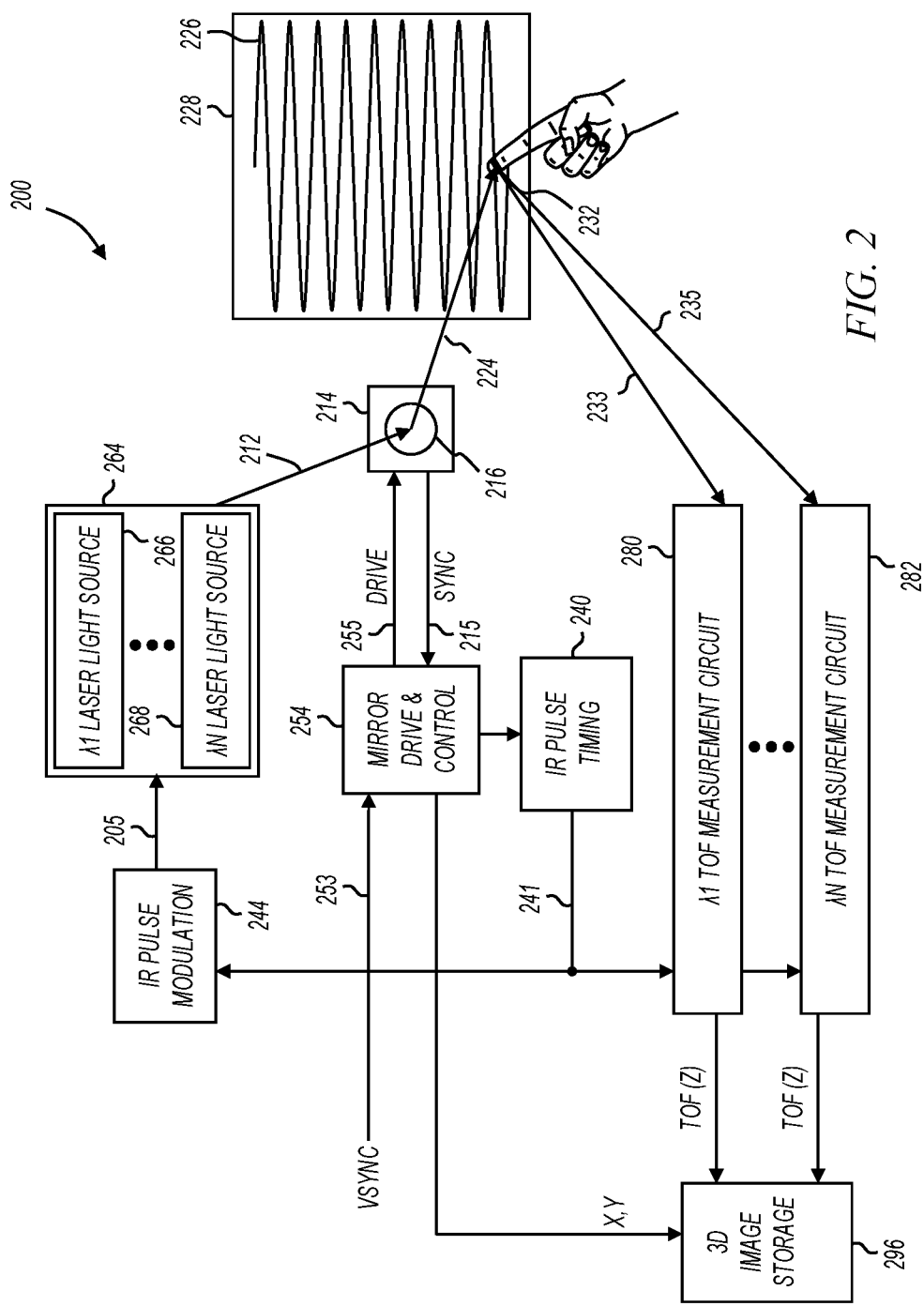
FIG. 2 shows a scanning 3D imaging system with time division multiplexing of multiple wavelengths in accordance with various embodiments of the present invention.

FIG. 2 shows a scanning 3D imaging system with time division multiplexing of multiple wavelengths in accordance with various embodiments of the present invention. System 200 includes laser light sources 264, scanning platform 214 with scanning mirror 216, and mirror drive and control circuit 254. System 200 also includes time-of-flight (TOF) measurement circuits 280 and 282, three dimensional (3D) image storage 296, infrared (IR) pulse timing circuit 240, and IR pulse modulation circuit 244.

Light sources 264 include multiple light sources capable of emitting laser light of different wavelengths. Light sources 264 shows two light sources, however, any number of light sources at different wavelengths may be included. For example, laser light source 266 emits laser light having a wavelength $\lambda 1$, and laser light source 268 emits laser light having a wavelength $\lambda N$, where N is any number. Light sources 264 include optics to combine light beam paths such that light from any of light sources 264 travels on the same collimated path as modulated laser beam 212. The beam 212 impinges on a scanning platform 214 which is part of a microelectromechanical system (MEMS) based scanner or the like, and reflects off of scanning mirror 216 to generate a controlled output beam 224. A scanning mirror drive and control circuit 254 provides one or more drive signal(s) 255 to control the angular motion of scanning mirror 216 to cause output beam 224 to generate a raster scan 226 in a field of view 228. In operation, light sources 264 produces light pulses at multiple different wavelengths either simultaneously or interleaved in time and scanning mirror 216 reflects the light pulses as beam 224 traverses raster scan 226. In some embodiments, this results in time multiplexing of light pulses having different wavelengths within a single collimated beam, and in other embodiments, this results in the simultaneous emission of light pulses having different wavelengths within a single collimated beam.

In some embodiments, raster scan 226 is formed by combining a sinusoidal component on the horizontal axis and a sawtooth component on the vertical axis. In these embodiments, controlled output beam 224 sweeps back and forth left-to-right in a sinusoidal pattern, and sweeps vertically (top-to-bottom) in a sawtooth pattern with the display blanked during flyback (bottom-to-top). FIG. 2 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern. The vertical axis is also referred to as the slow scan axis, and the horizontal axis is also referred to as the fast-scan axis. The labels "vertical" and "horizontal" are somewhat arbitrary, since a 90 degree rotation of the apparatus will switch the horizontal and vertical axes. Accordingly, the terms "vertical" and "horizontal" are not meant to be limiting.

Although scanning mirror 216 is shown as a single mirror that scans in two dimensions, this is not a limitation of the present invention. For example, in some embodiments, mirror 216 is replaced by two mirrors, one scanning in one dimension, and a second scanning in a second dimension.

In operation, mirror drive and control circuit 254 provides drive signal(s) 255 to control the angular motion of scanning mirror 216. In some embodiments, scanning mirror 216 includes one or more sensors to detect the angular position or angular extents of the mirror deflection (in one or both dimensions). For example, in some embodiments, scanning platform 214 includes a piezoresistive sensor that delivers a voltage that is proportional to the deflection of the mirror on the fast-scan axis. Further, in some embodiments, scanning platform 214 includes an additional piezoresistive sensor that delivers a voltage that is proportional to the deflection of the mirror on the slow-scan axis. The mirror position information is provided back to mirror drive and control circuit 254 as one or more sync signals 215. In these embodiments, mirror drive and control circuit 254 includes one or more feedback loops to modify the drive signals in response to the measured angular deflection of the mirror.

Mirror drive and control circuit 254 is implemented using functional circuits such as phase lock loops (PLLs), filters, adders, multipliers, registers, processors, memory, and the like. Accordingly, mirror drive and control circuit 254 may be implemented in hardware, software, or in any combination. For example, in some embodiments, control circuit 254 is implemented in an application specific integrated circuit (ASIC). Further, in some embodiments, some of the faster data path control is performed in an ASIC and overall control is software programmable.

Time-of-flight (TOF) measurement circuits 280 and 282 receive IR pulse timing information 241 from IR pulse timing circuit 240 and compares it to the timing of received IR pulses to measure round trip times-of-flight of an IR pulse, thereby measuring the distance (Z) to the point in the field of view 228 from which the IR pulse was reflected.

TOF measurement circuits 280 and 282 may be implemented with any suitable circuit elements. For example, in some embodiments, TOF measurement circuits 280 and 282 include digital and/or analog timers, integrators, correlators, comparators, registers, adders, or the like to compare the timing of the reflected IR pulses with the IR pulse timing information from IR pulse timing circuit 240. Example embodiments of TOF measurement circuits are described below with reference to later figures.

In some embodiments, light sources 264 source nonvisible light such as infrared (IR) light. In these embodiments, TOF measurement circuits 280 and 282 are able to detect respective wavelengths of nonvisible light. For example, in some embodiments, light source 266 may include a laser diode that produces infrared light with a wavelength of substantially 850 nanometers (nm), and TOF measurement circuit 280 receives and measures the TOF of light pulses with a wavelength of substantially 850 nm. Also for example, in some embodiments, light source 268 may include a laser diode that produces infrared light with a wavelength of substantially 900 nanometers (nm), and TOF measurement circuit 282 receives and measures the TOF of light pulses with a wavelength of substantially 900 nm. The wavelength of light is not a limitation of the present invention. Any wavelength, visible or nonvisible, may be used without departing from the scope of the present invention.

As shown in FIG. 2, the number of wavelengths detected by the TOF measurement circuits, N, matches the number of wavelengths sourced by the laser light sources. Any number of light sources, and any number of TOF measurement circuits may be included without departing from the scope of the present invention.

The rate at which pulses are created, reflected, and processed in the TOF measurement circuits may determine the horizontal spatial measurement resolution on raster pattern 226. For example, if pulses are created far apart in time, then measured points on raster pattern 226 may be further apart, and the horizontal spatial resolution will decrease. Also for example, if pulses are created closer in time, then the horizontal spatial resolution can increase. In some embodiments, time multiplexing pulses of different wavelengths allows for closer pulse spacing and higher resolution on the horizontal axis.

3D image storage 296 receives TOF information corresponding to distance (Z) information from the TOF measurement circuits and receives mirror position information (X,Y) from mirror drive and control circuit 254. 3D image storage 296 stores the (X,Y,Z) as a three dimensional (3D) data set that represents a depth map of the entire field of view 228. The depth map data may then be used for any suitable purpose. Examples include 3D imaging, gesture recognition, and the like.

3D image storage 296 may be implemented using any suitable circuit structure. For example, in some embodiments, 3D image storage 296 is implemented in a dual port memory device that can be written on one port and read on a second port. In other embodiments, 3D image storage 296 is implemented as data structures in a general purpose memory device. In still further embodiments, 3D image storage 296 is implemented in an application specific integrated circuit (ASIC).

IR pulse timing circuit 240 controls the generation of IR pulses and causes them to be generated at times that spatially place the pulses in a desired pattern within the field of view. For example, IR pulse timing circuit 240 may control the timing of IR pulses such that laser light pulses of different wavelengths are multiplexed in time. For example, IR pulse timing circuit 240 may provide pulse timing to cause laser light pulses of different wavelengths from light sources 264 to be interleaved in time in beam 212. Timing signals for each IR pulse are then provided to TOF measurement circuits 280 and 282 and IR pulse modulation circuit 244. IR pulse timing circuit 240 may be implemented using any suitable circuit elements. For example, IR pulse timing circuit 240 may be implemented using a processor and memory, a dedicated state machine, registers, adders, multipliers, and the like.

IR pulse modulation circuit 244 modulates pulses that are used to drive laser light sources 264. For example, IR pulse modulation circuit 244 may control the power level, pulse shape, or any other characteristic of the pulses used to drive laser light sources 264. IR pulse modulation circuit 244 modulates pulses in response to the timing signals received from IR timing circuit 240. IR pulse modulation circuit 244 may be implemented with any suitable circuit elements. For example, in some embodiments, IR pulse modulation circuit 244 includes digital-to-analog converters, amplifiers, filters, and the like.

Figure 3:
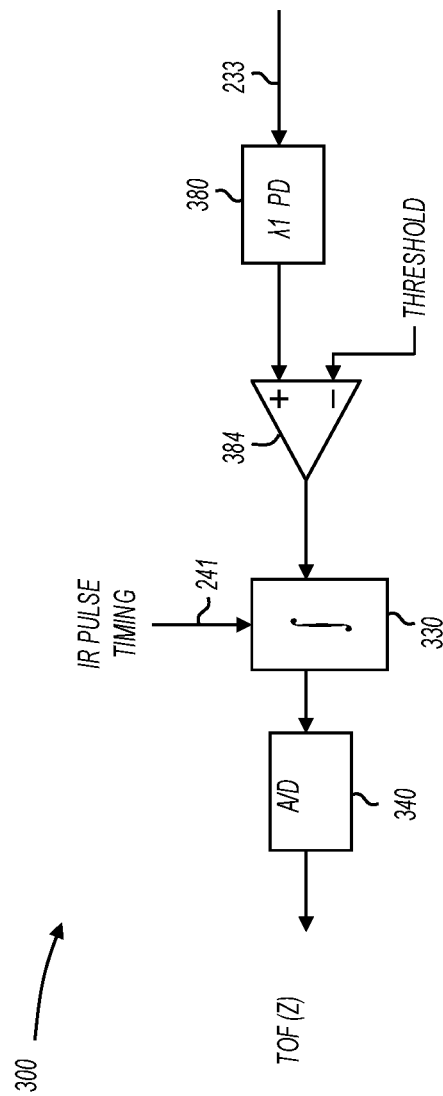
FIGS. 3 and 4 show time of flight (TOF) distance measurement circuits in accordance with various embodiments of the present invention.

FIG. 3 shows a time of flight (TOF) distance measurement circuit in accordance with various embodiments of the present invention. TOF distance measurement circuit 300 is an example circuit that may be implemented in system 200 (FIG. 2) to implement any of the TOF distance measurement circuits 280, 282. TOF measurement circuit 300 includes photodetector (PD) 380, comparator 384, integrator 330, and analog-to-digital converter (A/D) 340.

The light pulse created by light source 266 is reflected off scanning mirror 216 (FIG. 2) and is then reflected off an object in the field of view. The reflected pulse is sensed at photodetector (PD) 380, and the amplitude of the reflected pulse is compared to a threshold by comparator 384. Photodetector 380 may be any suitable light sensitive device. For example, in some embodiments, PD 380 may be a silicon PIN photodiode, an avalanche photodiode, or a silicon photomultiplier.

Integrator 330 receives the pulse timing 241 corresponding to the timing of the emission of a laser light pulse having wavelength λ1. Integrator 330 starts an integration period when a light pulse is emitted, and the integration period is stopped when the amplitude of the reflected pulse exceeds the threshold as determined by comparator 384. Analog-to-digital converter (A/D) 340 receives the output of integrator 330 and produces a digital signal that corresponds to the time-of-flight (TOF) of the laser pulse, which in turn corresponds to the distance (Z) between TOF measurement circuit 300 and the target surface.

The rate at which pulses are created, reflected, and processed in the receive signal path may determine the horizontal spatial measurement resolution on raster pattern 226 (FIG. 2). For example, if pulses are created far apart in time, then measured points on raster pattern 226 may be further apart, and the horizontal spatial resolution will decrease. Also for example, if pulses are created closer in time, then the horizontal spatial resolution can increase. In some embodiments, horizontal spatial resolution is increased by time division multiplexing pulses of different wavelengths.

The minimum pulse spacing of a single or specific wavelength laser light pulses may be limited by the round-trip transit time to the target as well as circuit processing times. For example, if a target is 10 meters distant, the minimum pulse period is equal to the pulse width plus the maximum round trip time plus any circuit processing time. Assuming the circuit processing time is zero, a pulse width of 20 nanoseconds (ns), and a round-trip transit time of 66.7 ns, the minimum pulse spacing period is about 90 ns.

Various embodiments of the present invention interleave pulses of different wavelengths to decrease the effective minimum pulse period and increase the effective horizontal resolution of 3D measurements.

Figure 4:
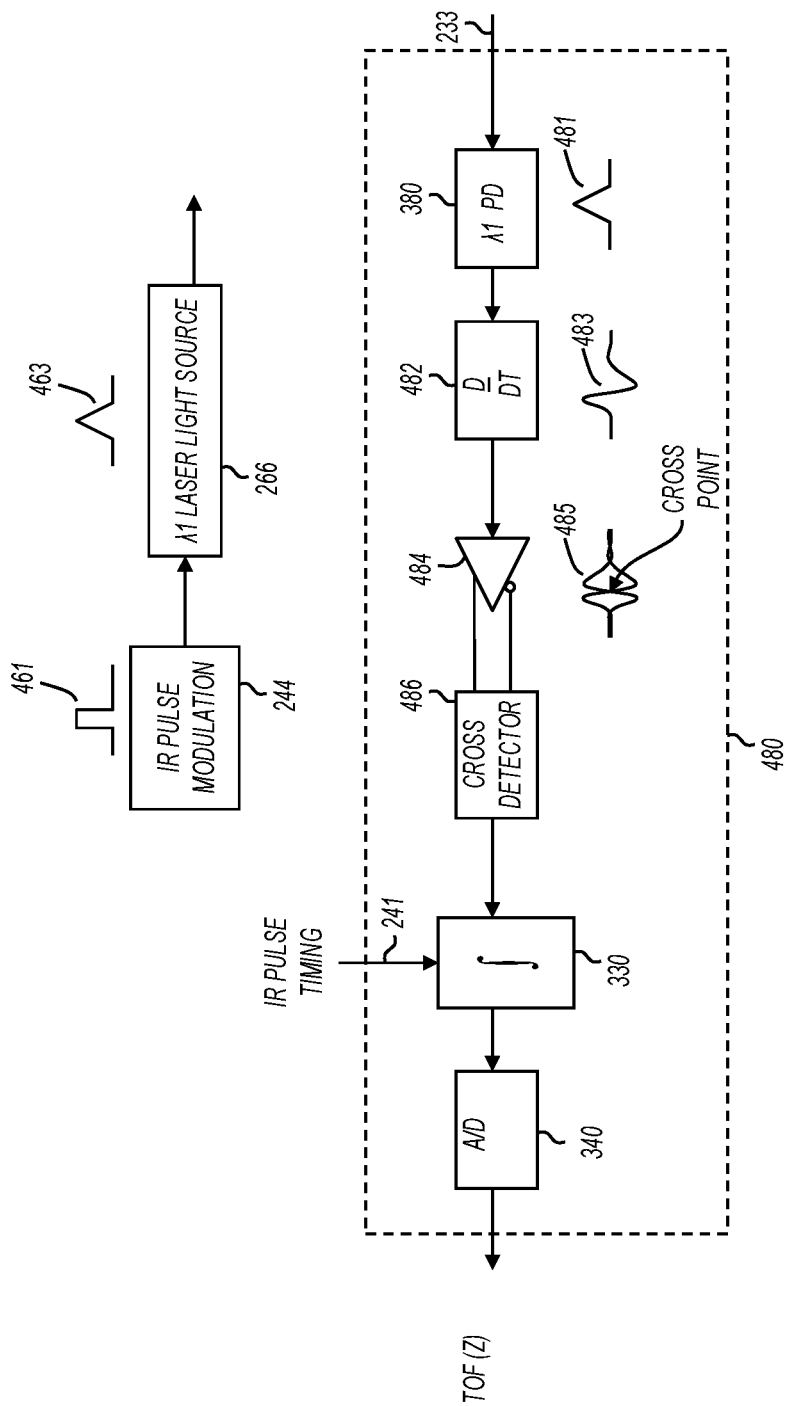

FIG. 4 shows a time of flight (TOF) distance measurement circuit in accordance with various embodiments of the present invention. FIG. 4 also shows IR pulse modulation circuit 244 and laser light source 266. IR pulse modulation circuit 244 produces pulse 461 to drive a light source. The example of FIG. 4 only shows light source 266; however in some embodiments, pulse are generated to drive multiple light sources of different wavelengths multiplexed in time. Light source 266 receives pulse 461 and creates light pulse 463 having wavelength λ1.

Laser light source 266 creates a pulse with a desired amplitude and pulse width. For example, pulse 463 has an abruptly changing amplitude. The abruptly changing amplitude is useful for timing measurement as is further explained below. In some embodiments, pulse 463 is a triangle shaped pulse, and laser light source 266 may create the triangle shaped pulse in any manner without departing from the scope of the present invention. For example, a series of resistor/capacitor (RC) circuits may be used to charge and discharge, thereby forming the triangle shaped pulse.

TOF distance measurement circuit 480 is an example circuit that may be implemented in system 200 (FIG. 2) to implement any of the TOF distance measurement circuits 280, 282. TOF measurement circuit 480 includes photodetector (PD) 380, differentiator 482, amplifier 484, cross detector 486, integrator 330, and analog-to-digital converter (A/D) 340. Integrator 330 receives the pulse timing 241 corresponding to the timing of pulse 463. Integrator 330 starts an integration period when a light pulse is emitted, and the integration period is stopped when the reflected pulse is detected as further described below.

The light pulse created by light source 266 is reflected off scanning mirror 216 (FIG. 2) and is then reflected off an object in the field of view. The reflected pulse is sensed at photodetector (PD) 380, as shown at 481. The reflected pulse may exhibit significant amplitude variations based on the distance to the reflection surface, but the abrupt change in amplitude remains largely intact. Differentiator 482 then differentiates the reflected pulse and produces the differentiated pulse shown at 483. It is important to note that the point on pulse 481 corresponding to the abrupt change in amplitude (the peak of the triangle shaped pulse) now corresponds to the rapidly falling portion of the differentiated pulse 483.

Amplifier 484 receives the differentiated pulse 483 and produces a differential output shown at 485. The two differential output signals are shown superimposed on each other at 485, and the point at which they cross is referred to herein as the "cross point". Cross detector 486 receives the differential output signals shown at 485 and detects the timing of the cross point. In some embodiments, cross detector 486 includes a differential amplifier to perform the cross detection.

Cross detector 486 notifies integrator 330 when the cross point is detected, and integrator 330 may end the integration period based on the timing of the cross point. Analog-to-digital converter (A/D) 340 receives the output of integrator 330 and produces a digital signal that corresponds to the time-of-flight (TOF) of the laser pulse, which in turn corresponds to the distance (Z) between TOF measurement circuit 480 and the target surface.

Systems that include TOF measurement circuit 480 provide a robust TOF distance measurement system that is fairly insensitive to reflected pulse amplitude variations due to large variations in target distances and surface reflectivity. For example, the differentiated received light pulse exhibits a zero crossing in place of the peak amplitude of the received pulse. Regardless of the received amplitude, the zero crossing appears at substantially the same relative location within the light pulse, so accurate timing is maintained regardless of amplitude variations.

Figure 5:
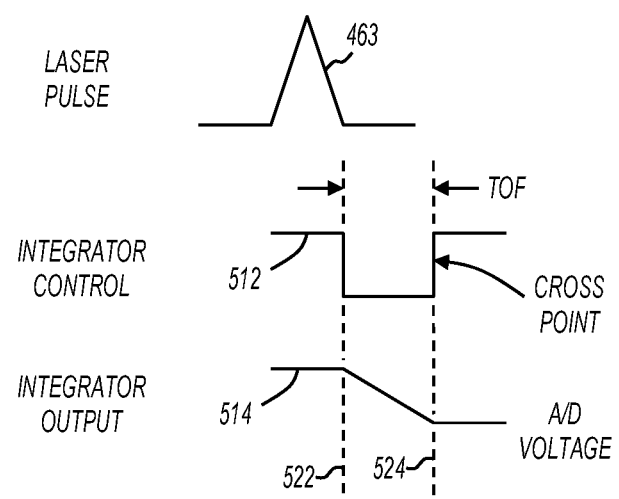
FIG. 5 shows a laser light pulse and integrator operation in accordance with various embodiments of the present invention.

FIG. 5 shows a laser light pulse and integrator operation in accordance with various embodiments of the present invention. The operation shown in FIG. 5 corresponds to the operation of the circuits shown in FIG. 4. Laser light pulse 463 is an example of a laser pulse with an abrupt change in amplitude. Laser light pulse 463 represents a pulse of light generated by any of light sources 264 (FIG. 2) and reflected by scanning mirror 216. When laser light pulse 463 is created, IR pulse timing circuit 240 (FIG. 2) modifies the integrator control signal 512 at time 522. In response to this control signal, integrator 330 begins an integration time.

In some embodiments, integrator 330 is an analog integrator that linearly modifies an output voltage during an integration time. One example integrator output voltage is shown at 514. After the falling edge of the integrator control signal at 522, the integrator output voltage begins to change. When cross detector 486 detects the cross point, integrator 330 stops the integration and the integration time comes to an end. The voltage of integrator output 514 represents the laser pulse TOF. The A/D 340 digitizes this voltage, and the process can start over.

The rate at which pulses are created, reflected, and processed in the receive signal path may determine the horizontal spatial measurement resolution on raster pattern 226 (FIG. 2). For example, if pulses are created far apart in time, then measured points on raster pattern 226 may be further apart, and the horizontal spatial resolution will decrease. Also for example, if pulses are created closer in time, then the horizontal spatial resolution can increase. In some embodiments, horizontal spatial resolution is increased by time division multiplexing pulses of different wavelengths.

Figure 6:
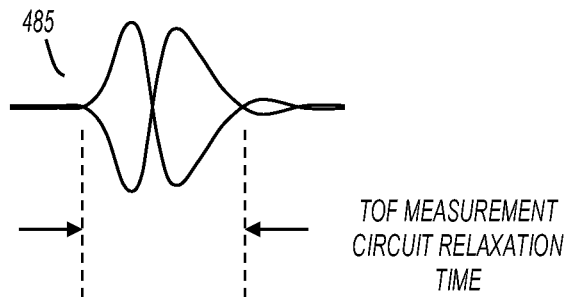
FIG. 6 shows a time-of-flight measurement circuit relaxation time in accordance with various embodiments of the present invention.

FIG. 6 shows a time-of-flight measurement circuit relaxation time in accordance with various embodiments of the present invention. As shown in FIG. 6, the differential signal 485 that is used to detect the cross point and therefore the time of flight occupies a definite and finite time, referred to herein as the TOF measurement circuit relaxation time. The TOF measurement circuit relaxation time limits the pulse spacing for pulses received by a single TOF measurement circuit in part because a second or subsequent pulse received during the first or current TOF measurement circuit relaxation time will corrupt the first or current TOF measurement process.

The TOF measurement circuit relaxation time for a particular embodiment is a function of many factors, such as component selection, amplifier bandwidths, and the like. Accordingly, the actual value of the TOF measurement circuit relaxation time is not a limitation of the present invention.

The minimum pulse spacing of a single or specific wavelength laser light pulses may be limited by the round-trip transit time to the target as well as circuit processing times. In embodiments represented by FIGS. 4-6, the circuit processing time is equal to the TOF measurement relaxation time. If, as an example, the TOF measurement relaxation time is 90 ns, the pulse width of 20 ns, and the round-trip transit time is 66.7 ns, the minimum pulse spacing period is about 180 ns. If, as another example, the TOF measurement circuit relaxation time is 100 ns, the pulse width is 30 ns, and the round-trip transit time is 80 ns, the minimum pulse spacing is about 210 ns.

Various embodiments of TOF measurement circuits have been described, and each places limits on the pulse spacing. In operation, any 3D imaging system with TOF measurement circuits will have a minimum pulse spacing, and that minimum pulse spacing may be a function of many factors, including a finite round-trip transit time, circuit architecture, or the like. The various embodiments of the present invention are not limited by the type or number of TOF measurement circuits.

Various embodiments of the present invention interleave pulses of different wavelengths in the same collimated output beam to increase resolution beyond the limited resolutions that would result from pulse spacings limited by round trip transit times and circuit architectures. These and other embodiments are described more fully below.

Figure 7:
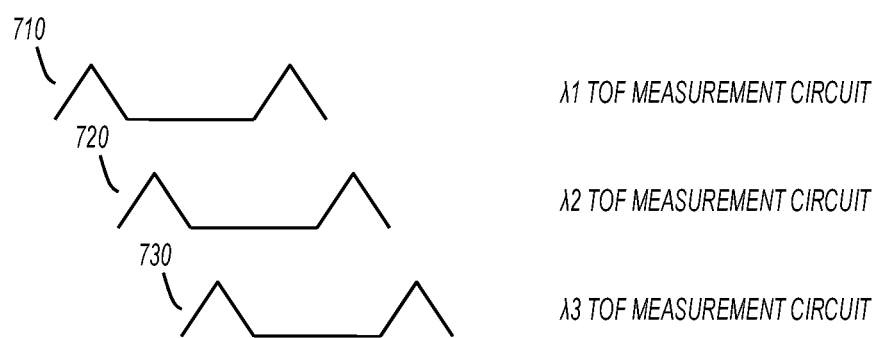
FIG. 7 shows laser light pulses of different wavelengths interleaved in time in accordance with various embodiments of the present invention.

FIG. 7 shows laser light pulses of different wavelengths interleaved in time in accordance with various embodiments of the present invention. FIG. 7 shows three different pulse trains 710, 720, and 730, each having different wavelengths. For example, pulse train 710 includes light having wavelength λ1, pulse train 720 includes light having wavelength λ2, and pulse train 730 includes light having wavelength λ3. Although the pulse trains are shown separately in FIG. 7, in operation, they occupy a single collimated output beam, such as output beam 224 (FIG. 2).

In some embodiments, pulses 710 are emitted from a single light source, such as light source 266 (FIG. 2), and are received and measured from a single TOF measurement circuit, such as TOF measurement circuit 280 (FIG. 2). Similarly, pulses 720 and 730 are produced and received by circuits for the corresponding wavelengths λ2 and λ3.

As described above with reference to FIGS. 3 and 6, the minimum pulse spacing for a given pulse train is a function of round trip transit times as well as time values that result from various circuit architectures. Various embodiments of the present invention interleave pulses of different wavelengths in a single output beam to increase the 3D image measurement resolution beyond that which would otherwise be limited by the round trip transit times as well as time values that result from various circuit architectures. The resulting time division multiplexing of different wavelengths increases native resolution of the 3D image.

Figure 8:
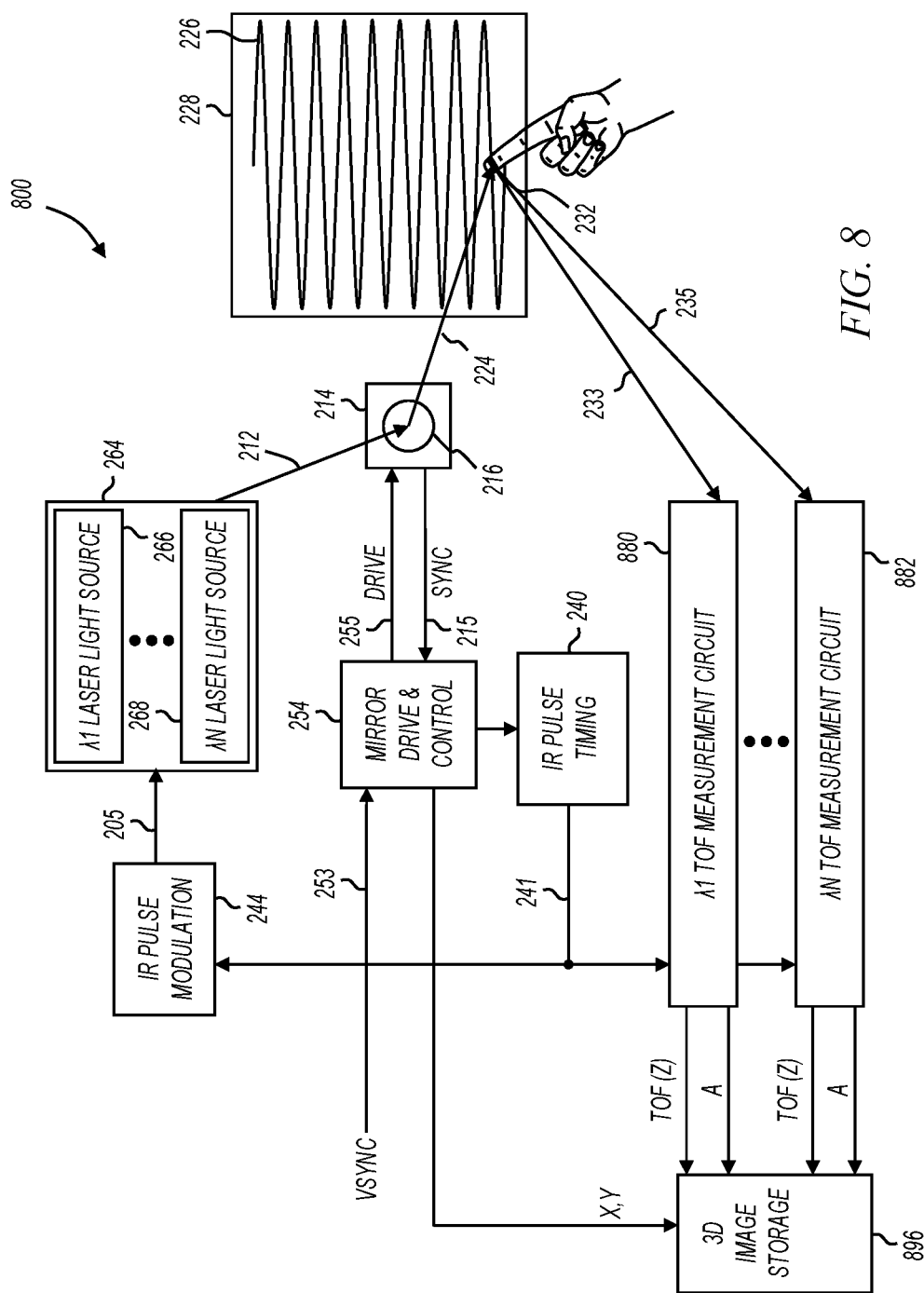
FIG. 8 shows a scanning 3D imaging system with laser light sources of at least two different wavelengths in accordance with various embodiments of the present invention.

FIG. 8 shows a scanning 3D imaging system with laser light sources of at least two different wavelengths in accordance with various embodiments of the present invention. Scanning 3D imaging system 800 is an apparatus similar to system 200 (FIG. 2) with the exception that the TOF measurement circuits 880, 882 also measure the amplitude of the received pulse. For example, TOF measurement circuit 880 measures both TOF and amplitude of pulses having a wavelength of $\lambda 1$, and TOF measurement circuit 882 measures both TOF and amplitude of pulses having a wavelength of $\lambda N$.

Various embodiments utilize the reflected pulse amplitude in different ways. For example, in some embodiments, pulse amplitude information is saved in 3D image storage 896 for each (X,Y,Z) triplet. Because the reflected pulse amplitude may vary based on reflectance, the amplitude may be useful for object recognition even when the distance (Z) values are equal. For example, a fine linen or human hair may result in identical Z values over a portion of a raster scan sweep, where the amplitude values may vary because of changes in reflectance.

Also for example, amplitude values may be used to determine whether circuit elements in the receive path are saturated and to adjust power levels of subsequent pulses. These and other embodiments are described further below with reference to later figures.

Figure 9:
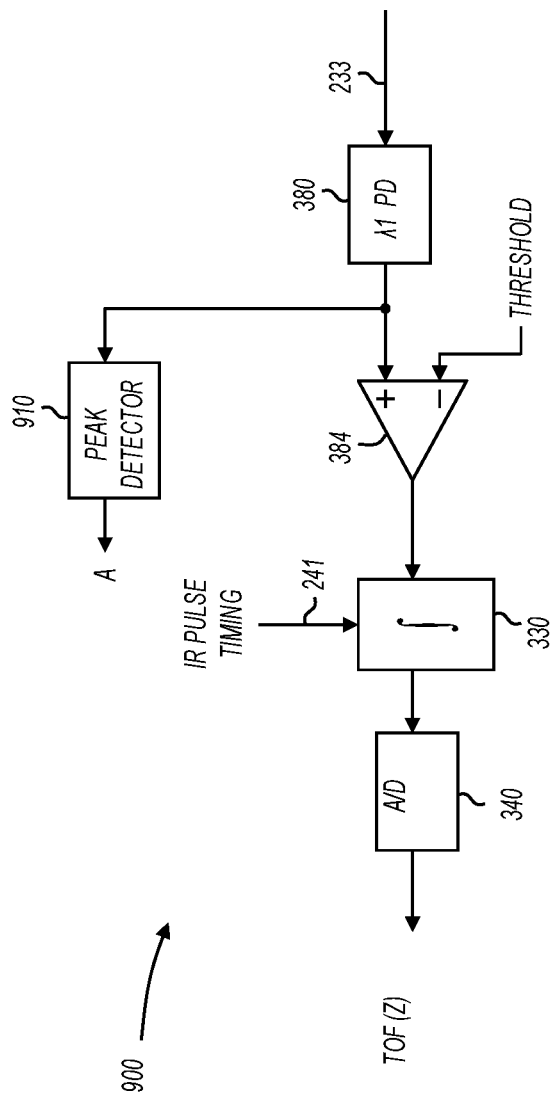
FIG. 9 shows a TOF distance measurement circuit with a peak detector in accordance with various embodiments of the present invention.

FIG. 9 shows a TOF distance measurement circuit with a peak detector in accordance with various embodiments of the present invention. TOF distance measurement circuit 900 is similar to TOF distance measurement circuit 300 (FIG. 3) with the exception that circuit 900 includes peak detector 910. Peak detector 910 is coupled to detect the peak output of photodetector 380 and provide an amplitude output A. TOF distance measurement circuit 900 is an example circuit that may be implemented in system 800 (FIG. 8) to implement any of the TOF distance measurement circuits 880, 882.

Figure 10:
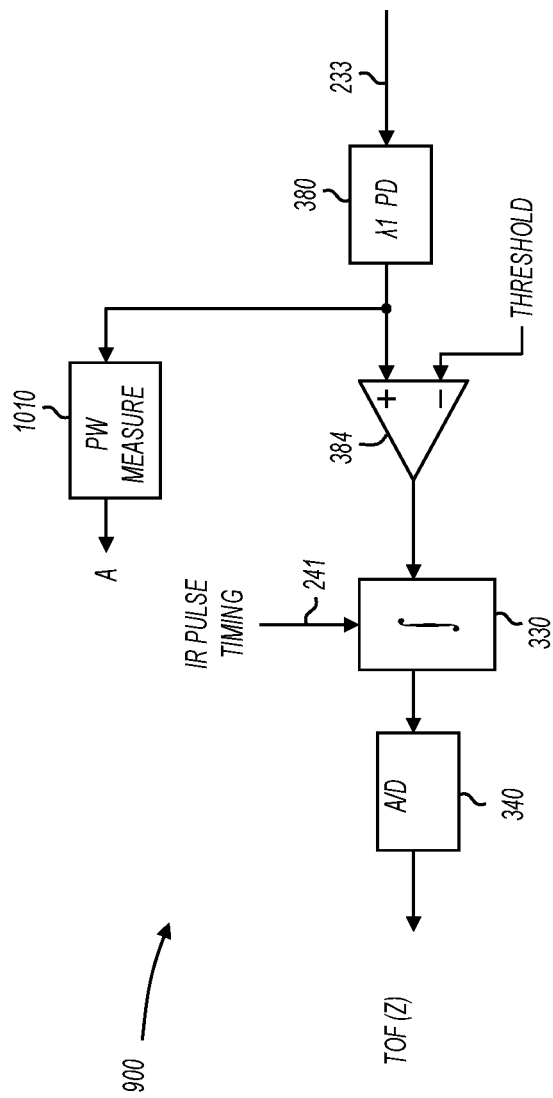
FIG. 10 shows a TOF distance measurement circuit with a pulse width measurement circuit in accordance with various embodiments of the present invention.

FIG. 10 shows a TOF distance measurement circuit with a pulse width measurement circuit in accordance with various embodiments of the present invention. TOF distance measurement circuit 1000 is similar to TOF distance measurement circuit 300 (FIG. 3) with the exception that circuit 900 includes pulse width measurement circuit 1010. Pulse width measurement circuit 1010 is coupled to measure the width of pulses detected by photodetector 380. For example, in some embodiments, pulse width measurement circuit 1010 measures the full width half maximum (FWHM) of the pulse, and in other embodiments, pulse width measurement circuit 1010 measures the pulse width at the 1/e-squared level of the pulse. In still further embodiments, pulse width measurement circuit 1010 measures the pulse width at a different level based on the slew rate and/or the shape of the transmitted pulse.

Although TOF distance measurement circuit 1000 does not measure pulse amplitude directly, the measured pulse width may be used as a proxy amplitude, since pulses with larger amplitude generally also have a larger pulse width. Accordingly, pulse width measurement circuit is shown providing amplitude A, whereas in operation, it actually provides a pulse width measurement as a proxy for the amplitude A. TOF distance measurement circuit 1000 is an example circuit that may be implemented in system 800 (FIG. 8) to implement any of the TOF distance measurement circuits 880, 882.

Figure 11:
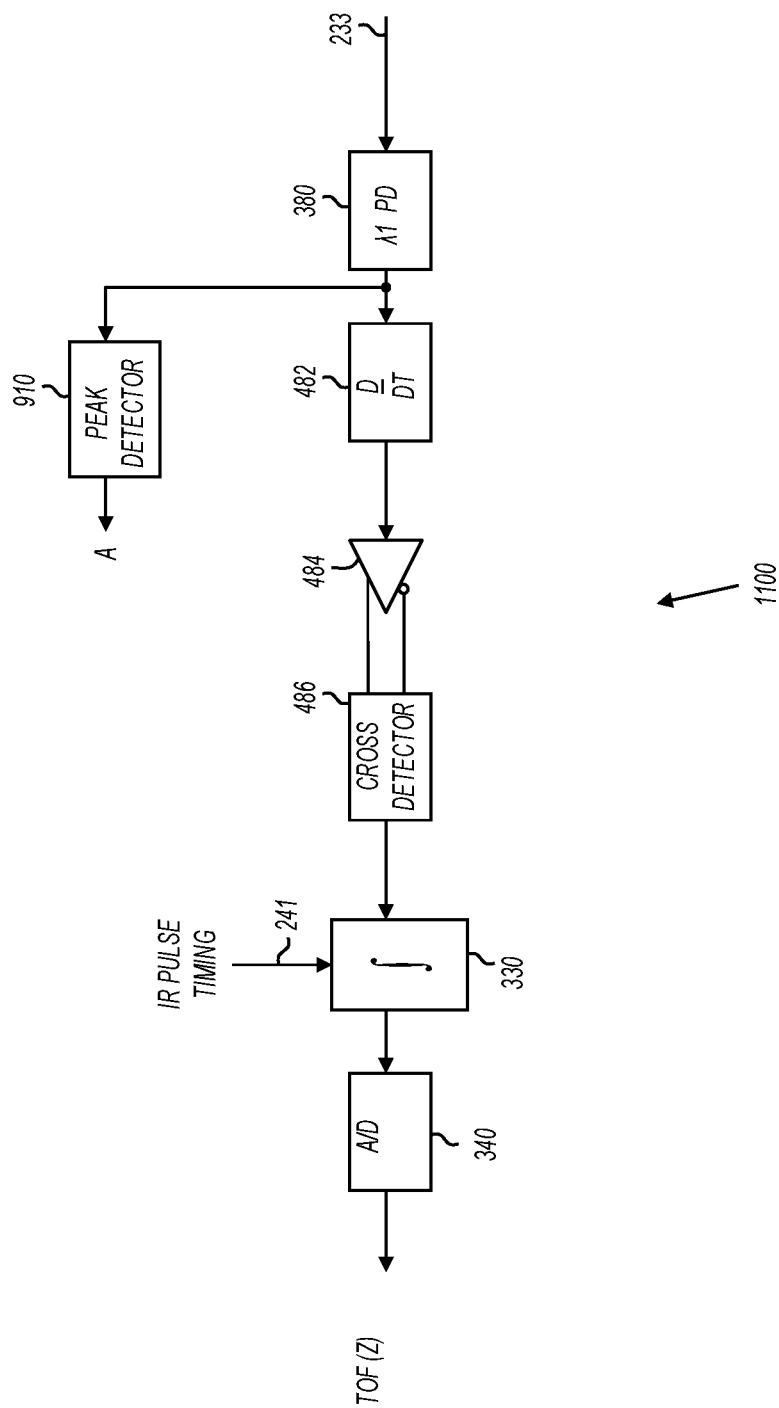
FIG. 11 shows a TOF distance measurement circuit with a peak detector in accordance with various embodiments of the present invention.

FIG. 11 shows a TOF distance measurement circuit with a peak detector in accordance with various embodiments of the present invention. TOF distance measurement circuit 1100 is similar to TOF distance measurement circuit 400 (FIG. 4) with the exception that circuit 1100 includes peak detector 910. Peak detector 910 is coupled to detect the peak output of photodetector 380 and provide an amplitude output A. TOF distance measurement circuit 1100 is an example circuit that may be implemented in system 800 (FIG. 8) to implement any of the TOF distance measurement circuits 880, 882.

Figure 12:
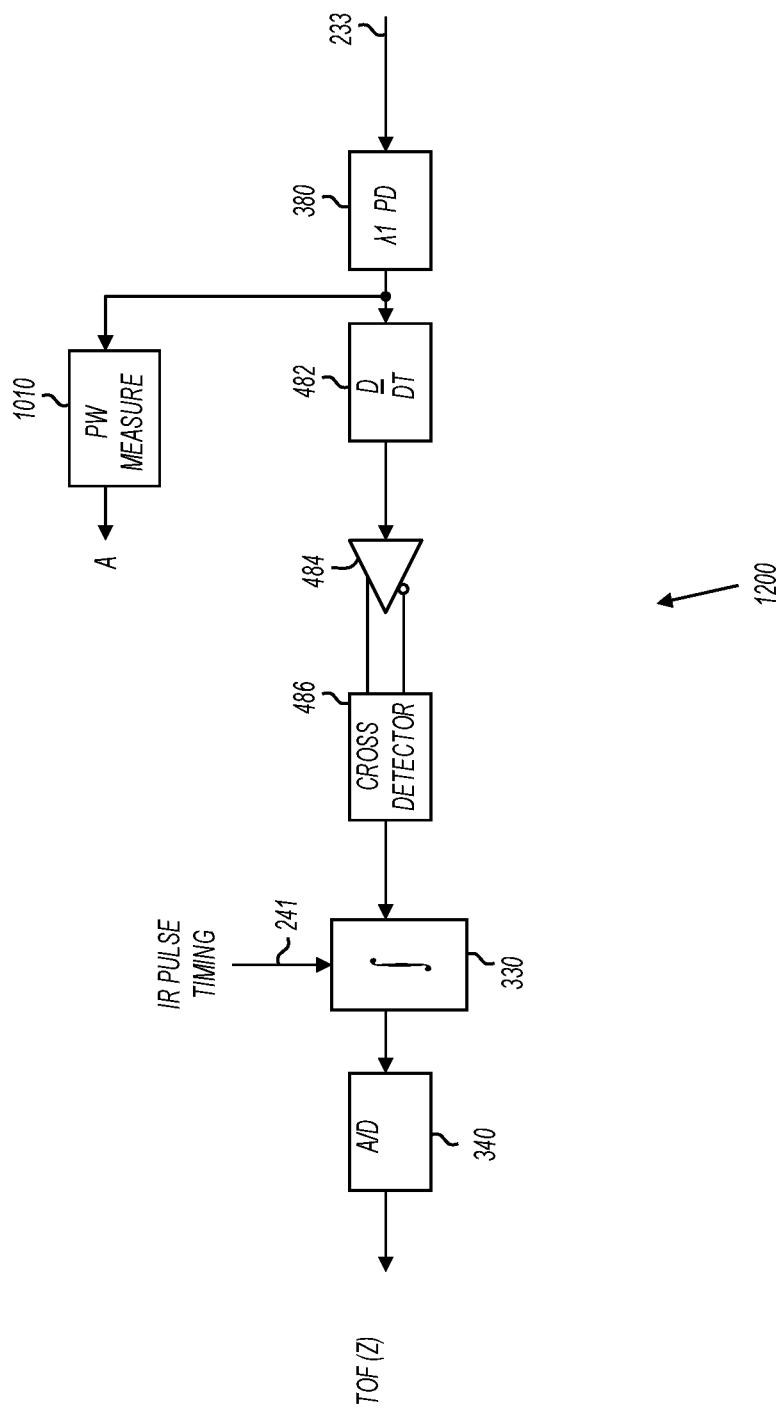
FIG. 12 shows a TOF distance measurement circuit with a pulse width measurement circuit in accordance with various embodiments of the present invention.

FIG. 12 shows a TOF distance measurement circuit with a pulse width measurement circuit in accordance with various embodiments of the present invention. TOF distance measurement circuit 1200 is similar to TOF distance measurement circuit 400 (FIG. 4) with the exception that circuit 1100 includes pulse width measurement circuit 1010. Pulse width measurement circuit 1010 is coupled to measure the width of pulses detected by photodetector 380. Although TOF distance measurement circuit 1200 does not measure pulse amplitude directly, the measured pulse width may be used as a proxy amplitude, since pulses with larger amplitude generally also have a larger pulse width. Accordingly, pulse width measurement circuit is shown providing amplitude A, whereas in operation, it actually provides a pulse width measurement as a proxy for the amplitude A. TOF distance measurement circuit 1200 is an example circuit that may be implemented in system 800 (FIG. 8) to implement any of the TOF distance measurement circuits 880, 882.

Figure 13:
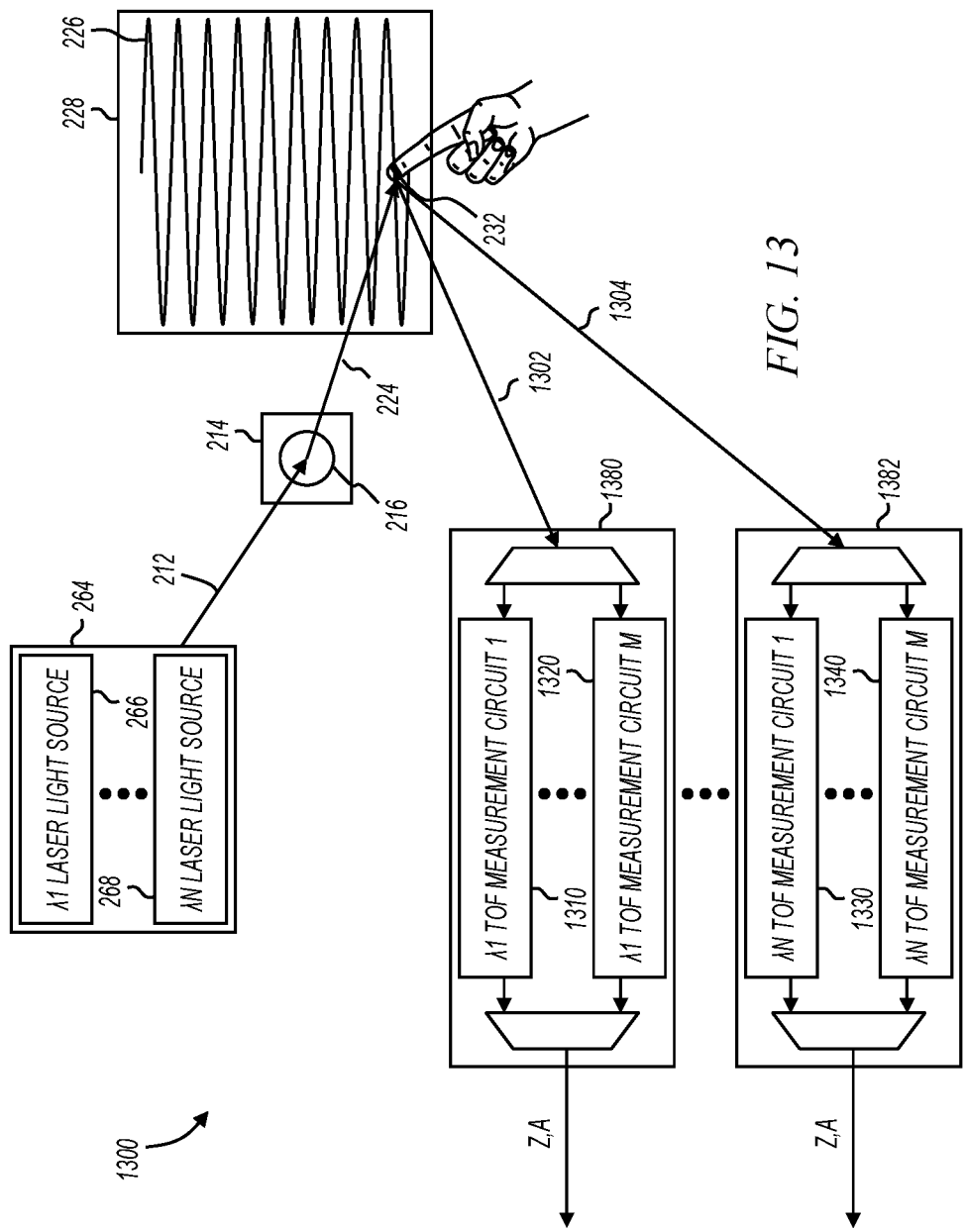
FIG. 13 shows a 3D imaging device in accordance with various embodiments of the present invention.

FIG. 13 shows a scanning 3D imaging system with laser light sources of at least two different wavelengths in accordance with various embodiments of the present invention. Scanning 3D imaging system 1300 shows light sources, scanning mirror, and TOF measurement circuits. Scanning 3D imaging system 1300 also includes (intentionally omitted from the figure) control circuits, modulation circuits, and the like, which are described above with reference to FIG. 2. Laser light sources 264 and scanning platform 214 are described above with reference to FIG. 2.

Scanning 3D imaging system 1300 includes a first plurality of TOF measurement circuits 1380 that receive light at a first wavelength $\lambda 1$, and a second plurality of TOF measurement circuits 1382 that receive light at a second wavelength $\lambda N$. For example, first plurality 1380 includes TOF measurement circuits 1310 and 1320, and second plurality 1382 includes TOF measurement circuits 1330 and 1340. In some embodiment, any number N of plurality of TOF measurement circuits may be included, and each plurality of TOF measurement circuits may include any number M of TOF measurement circuits.

In operation, light pulses of a particular wavelength are processed in a time multiplexed fashion by the plurality of TOF measurement circuits. For example, laser light pulses having a wavelength of $\lambda 1$ may be processed by the M TOF measurement circuits 1310, 1320. By time multiplexing TOF measurement circuits of a particular wavelength, various embodiments of the present invention may further increase resolution of a resulting 3D image.

Figure 14:
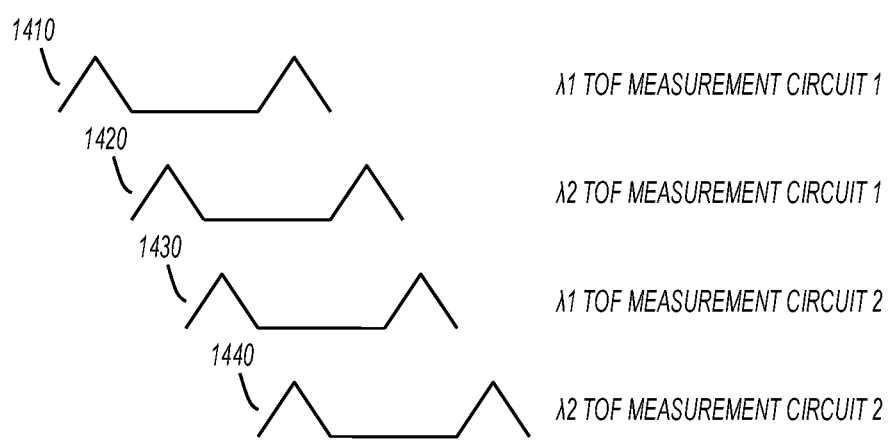
FIG. 14 shows laser light pulses of different wavelengths interleaved in time in accordance with various embodiments of the present invention.

FIG. 14 shows laser light pulses of different wavelengths interleaved in time in accordance with various embodiments of the present invention. FIG. 14 shows the operation of scanning 3D imaging system 1300 (FIG. 13) with N=2 and M=2. Accordingly, four different pulse trains 1410, 1420, 1430, and 1440 are shown, with pulse trains 1410 and 1430 having wavelength λ1, and pulse trains 1420 and 1440 having wavelength λ2. Although the pulse trains are shown separately in FIG. 14, in operation, they occupy a single collimated output beam, such as output beam 224 (FIG. 2).

In some embodiments, pulses 1410 and 1430 are emitted from a single light source, such as light source 266 (FIG. 13), and are received and measured in two separate TOF measurement circuits. For example, pulse train 1410 may be received and measured by TOF measurement circuit 1310 (FIG. 13), and pulse train 1430 may be received and measured by TOF measurement circuit 1320 (FIG. 13), where M=2. Further, in some embodiments, pulses 1420 and 1440 are emitted from a single light source, such as light source 268 (FIG. 13) where N=2, and are received and measured in two separate TOF measurement circuits. For example, pulse train 1410 may be received and measured by TOF measurement circuit 1330 (FIG. 13), and pulse train 1440 may be received and measured by TOF measurement circuit 1340 (FIG. 13), where M=2.

As described above with reference to FIGS. 3 and 6, the minimum pulse spacing for a given pulse train is a function of round trip transit times as well as time values that result from various circuit architectures. Various embodiments of the present invention interleave pulses of different wavelengths in a single output beam and include a plurality of TOF measurement circuits for each wavelength to increase the 3D image measurement resolution beyond that which would otherwise be limited by the round trip transit times as well as time values that result from various circuit architectures. The resulting time division multiplexing of different wavelengths increases native resolution of the 3D image.

Figure 15:
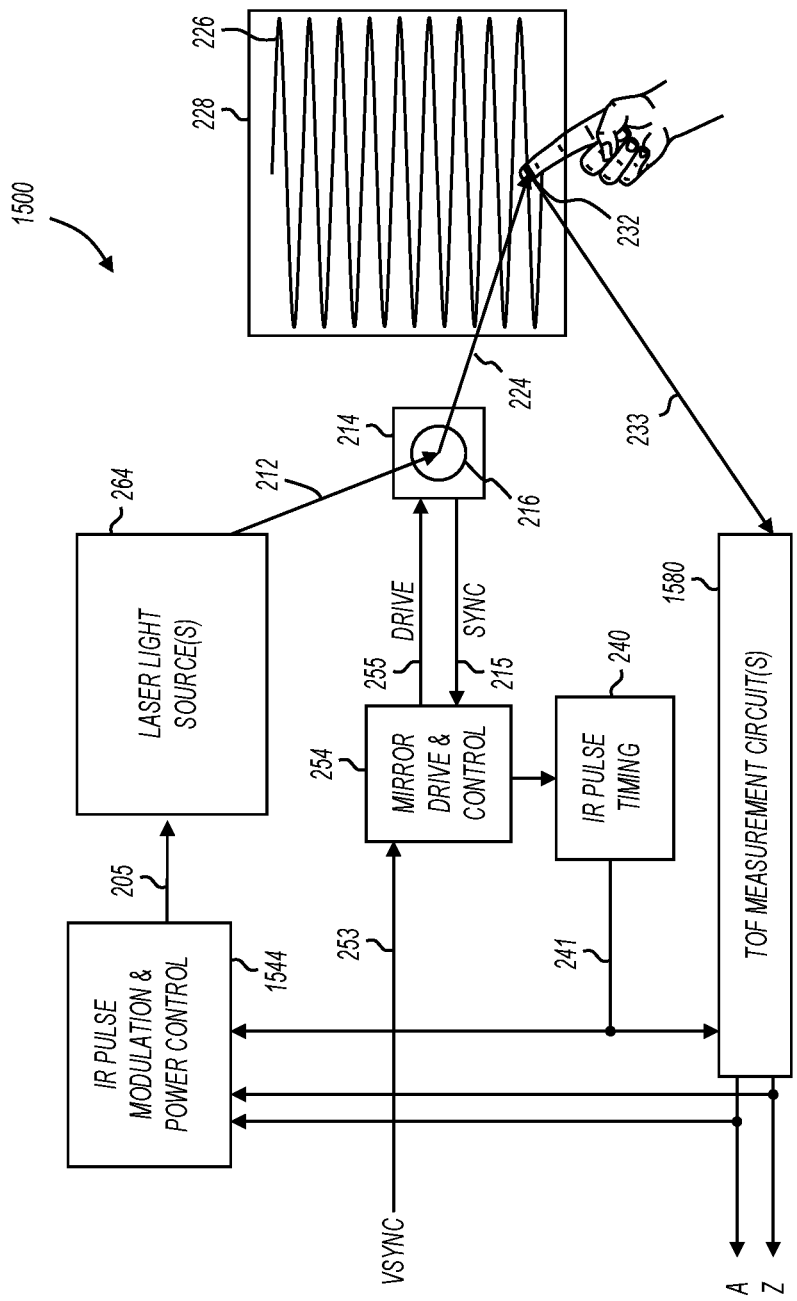
FIG. 15 shows a 3D imaging device in accordance with various embodiments of the present invention.

FIG. 15 shows a 3D imaging device in accordance with various embodiments of the present invention. 3D imaging device 1500 is similar to previously described 3D imaging systems with the exception of IR pulse modulation and power control circuit 1544. In operation, IR pulse modulation and power control circuit 1544 receives the distance measurement Z and the reflected pulse amplitude measurement A as measured by the TOF distance measurement circuits. For example, TOF distance measurement circuit 1580 measures the TOF and the reflected pulse amplitude (or pulse width as described above), and provides them to IR pulse modulation and power control circuit 1544.

TOF distance measurement circuits 1580 may include any number of measurement circuits that also measure amplitude. Examples include any of the TOF measurement circuits described above with reference to FIGS. 9-12.

In some embodiments, IR pulse modulation and power control circuit 1544 modifies the power level of pulses based at least in part on the amplitude of reflected pulses. For example, in some embodiments, IR pulse modulation and power control circuit 1544 compares the amplitude of reflected pulses to determine if circuit elements in the receive path are saturated, and modifies the power level of subsequent pulses so that the circuit elements will not be saturated. Also for example, in some embodiments, IR pulse modulation and power control circuit 1544 reduces the power level of subsequent pulses when an object is detected that is too close. These and other embodiments are described further below.

IR pulse modulation and power control circuit 1544 may be implemented with any suitable circuit elements. For example, in some embodiments, IR pulse modulation and power control circuit 1544 includes comparators, amplifiers, digital and/or analog timers, registers, adders, or the like to compare the amplitudes and TOFs of reflected IR pulses, and to modify power levels of subsequent pulses.

Figure 16:
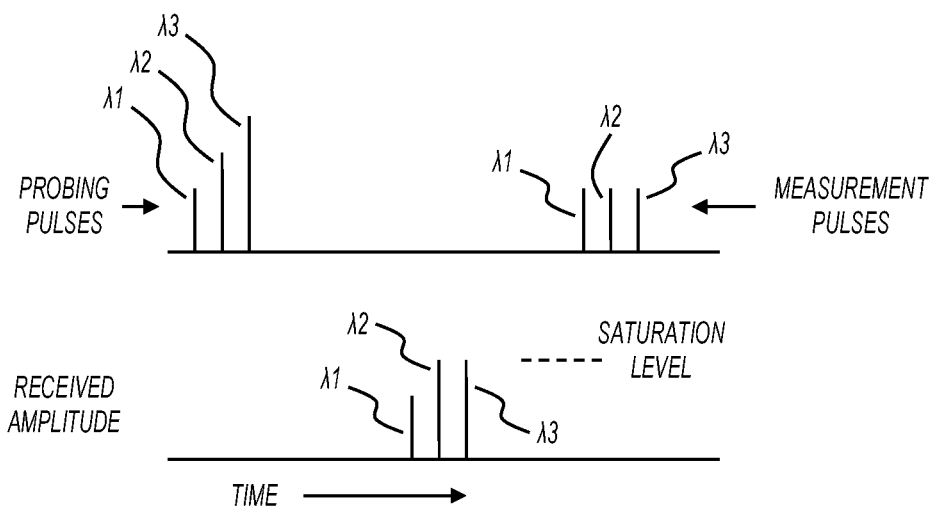
FIG. 16 shows probing laser light pulses and measurement laser light pulses in accordance with various embodiments of the present invention.

FIG. 16 shows probing laser light pulses and measurement laser light pulses in accordance with various embodiments of the present invention. In some embodiments, the probing pulses are emitted from the light sources at the command of IR pulse modulation and power control circuit 1544 (FIG. 15). As shown in FIG. 16, the probing pulses include multiple pulses of different wavelengths. In some embodiments, the probing pulses are separated in time as shown, and in other embodiments, the probing pulses are emitted substantially simultaneously. As used herein, the term "substantially simultaneously" means pulses that are emitted at the same time or pulses that are emitted so close in time as to appear that they are emitted at the same time.

Three probing pulses at wavelengths λ1, λ2, and λ3 are shown in FIG. 16, however this is not a limitation of the present invention. Any number of probing pulses with different wavelengths may be emitted as probing pulses. The probing pulses are emitted with different power levels to "probe" the reflectance of the target surface. As shown in FIG. 16, the probing pulses may be increasing in power level over time. In some embodiments, the probing pulses are decreasing in power level over time.

The received amplitude of reflected pulses is also shown in FIG. 16. In this example, the received amplitude of reflected pulses at wavelengths λ2 and λ3 correspond to a saturation level of circuit components in the receive path (TOF distance measurement circuits). For example, the saturation level may correspond to rail voltages for amplifiers or other circuit components. When received amplitudes are measured at the rail voltages, then the measured pulse has either saturated the receive path, or has come very close to saturating the receive path. Further, in this example, the received amplitude of the reflected pulse having a wavelength of λ1 is less than the saturation level.

In response to received amplitudes of reflected pulses, IR pulse modulation and power control circuit 1544 modifies the power level of subsequent pulses and emits the measurement pulses as shown in FIG. 16. Measurement pulses are then used for TOF and amplitude measurement to create a 3D image as described above. As shown in FIG. 16, the measurement pulses include multiple pulses of different wavelengths. In some embodiments, the probing pulses are separated in time as shown, and in other embodiments, the probing pulses are emitted substantially simultaneously.

In some embodiments, the measurement pulses follow the probing pulses in the same horizontal sweep of a raster scan, and in other embodiments, the measurement pulses follow the probing pulses in a later horizontal sweep of a raster scan. In still further embodiments, the measurement pulses follow the probing pulses in a later raster scan or "frame." These and other embodiments are further described below.

The terms "probing pulses" and "measurement pulses" are used herein to describe the operation of various systems, and are not meant to be limiting. For example, probing pulses may be used for measurement, and measurement pulses may be used to probe the reflectance of targets. In some embodiments, probing pulses and measurement pulses are combined. For example, probing pulses of different wavelengths and power levels may be emitted, and one of the probing pulses may then be chosen to be used as a measurement pulse.

Figure 17:
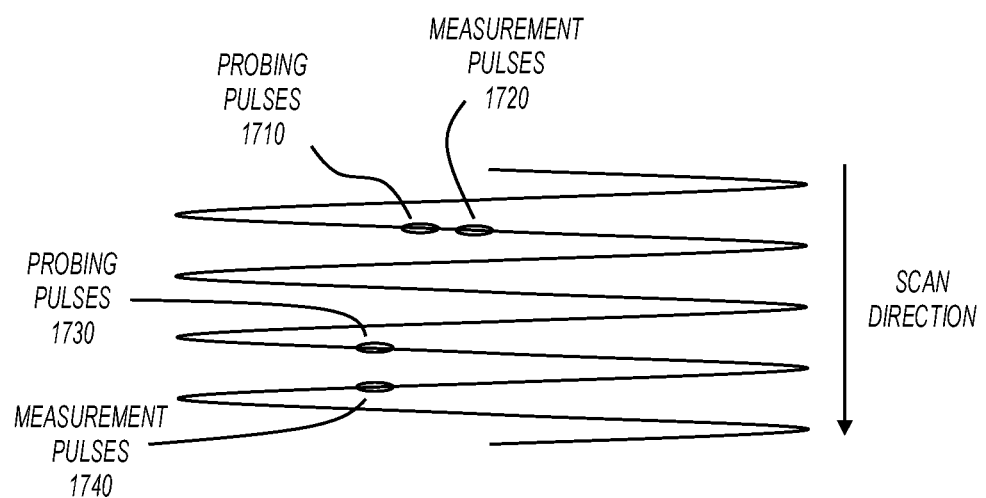
FIG. 17 shows probing laser light pulses and measurement laser light pulses on a raster scan in accordance with various embodiments of the present invention.

FIG. 17 shows probing laser light pulses and measurement laser light pulses on a raster scan in accordance with various embodiments of the present invention. As shown in 1710 and 1720, in some embodiments, measurement pulses may follow probing pulses on the same sweep of a raster scan. Further, as shown at 1730 and 1740, measurement pulses may follow probing pulses on a subsequent sweep of the same raster scan. For example, in some embodiments, probing pulses are emitted in all odd numbered sweeps and measurement pulses are emitted in all even numbered sweeps.

In still further embodiments, measurement pulses may follow probing pulses on a subsequent raster scan. For example, measurement pulses 1720 may occupy the same location as probing pulses 1710 on a subsequent raster scan. In these embodiments, a first raster scan may only include probing pulses, and the subsequent raster scan may only include measurement pulses.

Figure 18:
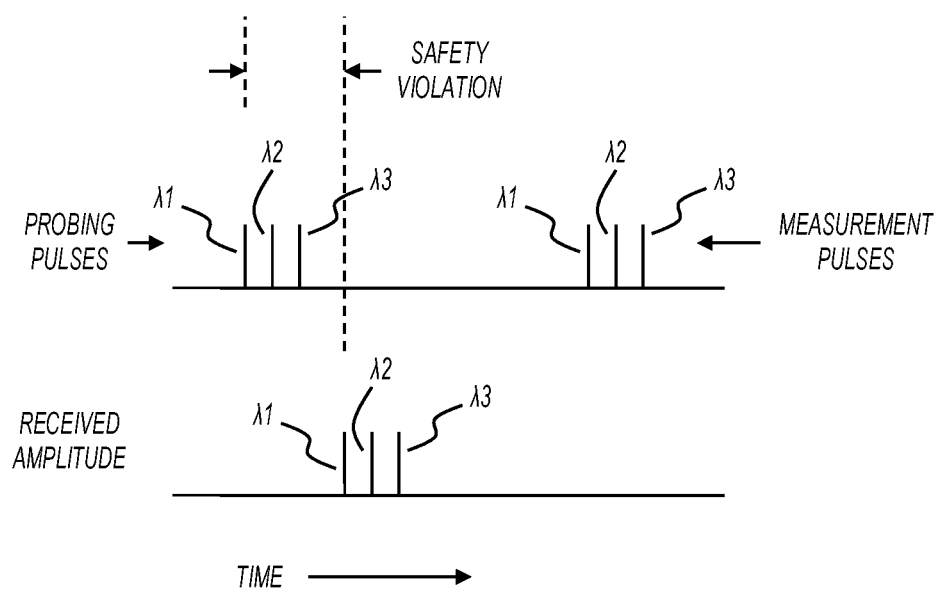
FIG. 18 shows probing laser light pulses resulting in a safety violation in accordance with various embodiments of the present invention.

FIG. 18 shows probing laser light pulses resulting in a safety violation in accordance with various embodiments of the present invention. The probing pulses shown in FIG. 18 include three pulses at different wavelengths and at the same power level, although this is not a limitation of the present invention. For example, probing pulses with varying power levels may be used.

In operation, IR pulse modulation and power control circuit 1544 (FIG. 15) sets the pulse power level and commands the probing pulses to be emitted. IR pulse modulation and power control circuit 1544 compares the TOF values (Z) of the reflected pulses, and compares them to a threshold to determine if there is a safety violation.

In the example of FIG. 18, reflected pulses are measured and the TOF indicates a safety violation. As used herein, "safety violation" refers to an object being detected too close to the imaging device. When a safety violation is detected, various embodiments of the present invention reduce power levels to a safe level. In some embodiments, this means continuing to output laser light pulses, but at a low power level, and in other embodiments, this means refraining from emitting anything but low power probing pulses until there is no longer a safety violation. In the example of FIG. 18, measurement pulses are emitted at a low power level after the safety violation is detected.

Figure 19:
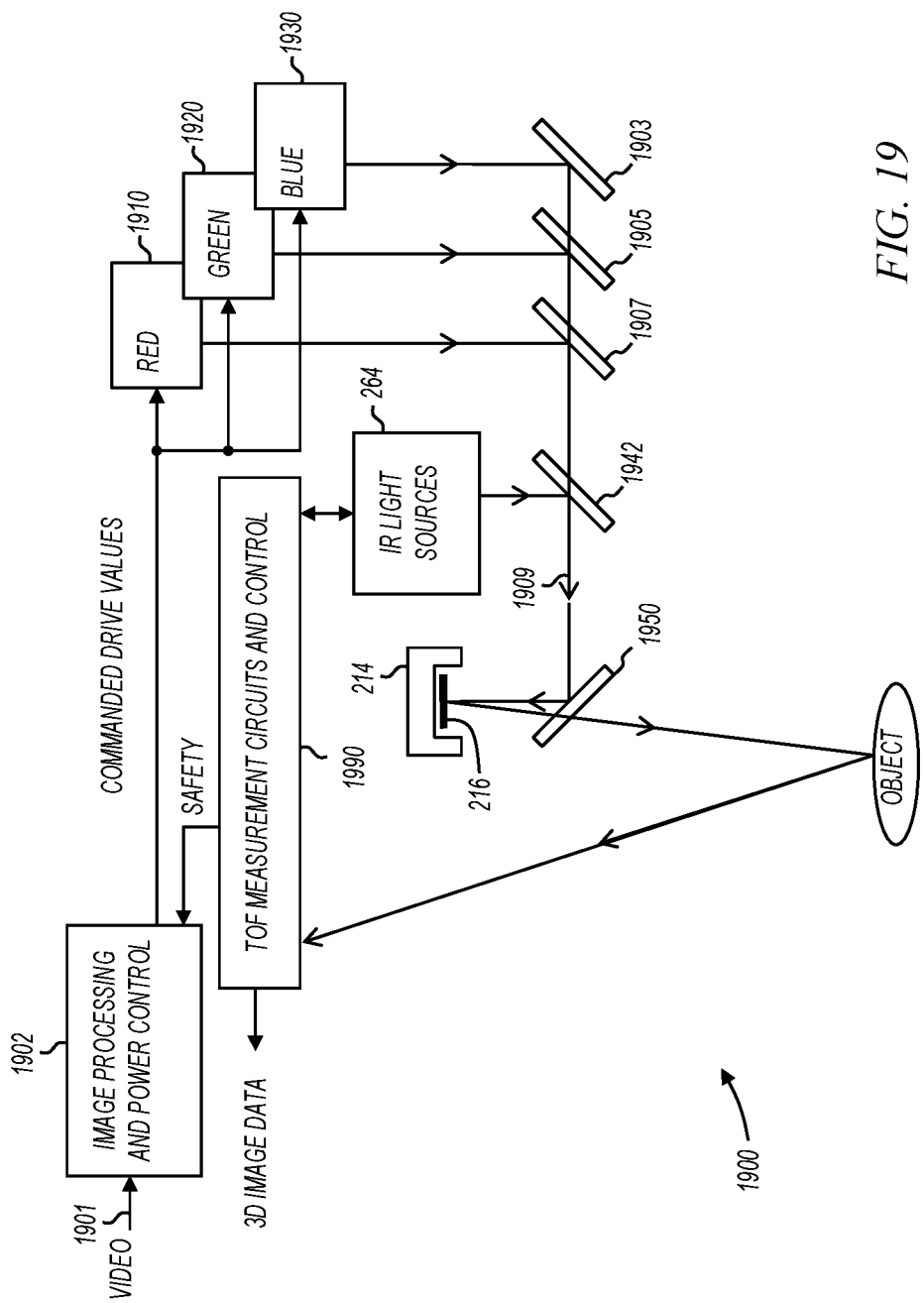
FIG. 19 shows a 3D imaging device in accordance with various embodiments of the present invention.

FIG. 19 shows a 3D imaging device in accordance with various embodiments of the present invention. 3D imaging device 1900 combines a projector with 3D imaging capabilities. The system receives and displays video content in red, green, and blue, and uses infrared light for 3D imaging.

3D imaging device 1900 includes image processing component 1902, TOF measurement circuits and control component 1990, red laser module 1910, green laser module 1920, blue laser module 1930, and infrared laser light sources 264. Light from the laser modules is combined with mirrors 1903, 1905, 1907, and 1942. 3D imaging device 1900 also includes fold mirror 1950, and scanning platform 214 with scanning mirror 216.

In operation, image processing component 1902 processes video content at 1901 and maps image pixels to commanded drive values for each of the red, green, and blue laser sources such that the output intensity from the lasers is consistent with the input image content. In some embodiments, this process occurs at output pixel speeds in excess of 150 MHz.

Image processing component 1902 is also responsive to a safety signal received from TOF measurement circuits and control component 1990. In operation, if TOF measurement circuits and control component 1990 determines that a safety violation exists, the safety signal is asserted and image processing component 1902 responds by reducing power levels to a safe level. In some embodiments, this results in no visible light emission until the safety violation is removed.

The laser beams are then directed onto an ultra-high speed gimbal mounted 2 dimensional bi-axial laser scanning mirror 216. In some embodiments, this bi-axial scanning mirror is fabricated from silicon using MEMS processes. The vertical axis of rotation is operated quasi-statically and creates a vertical sawtooth raster trajectory. The horizontal axis is operated on a resonant vibrational mode of the scanning mirror. In some embodiments, the MEMS device uses electromagnetic actuation, achieved using a miniature assembly containing the MEMS die, small subassemblies of permanent magnets and an electrical interface, although the various embodiments are not limited in this respect. For example, some embodiments employ electrostatic or piezoelectric actuation. Any type of mirror actuation may be employed without departing from the scope of the present invention.

Embodiments represented by FIG. 19 combine the video projection described in the previous paragraph with IR laser light sources 264, and TOF measurement circuits and control component 1990 for 3D imaging of the projection surface. TOF measurement circuits and control component 1990 includes components described above with reference to previous figures to detect and measure times of flight of laser light pulses of different wavelengths using a plurality of TOF measurement circuits. For example, in some embodiments, TOF measurement circuits and control component 1990 includes mirror drive and control component 254, IR pulse timing circuit 240, IR pulse modulation circuit 244, and TOF measurement circuits 280 and 282 FIG. 2). Further, in some embodiments, TOF measurement circuits and control component 1990 may include multiple pluralities of TOF measurement circuits such as those shown at 1380 and 1382 (FIG. 13).

The 3D imaging apparatus may be used to project video content while at the same time invisibly probing the environment using IR light pulses to create a 3D image of the field of view. These images can be downloaded at kHz rates. Processing of these images provides ultra-high speed 3D depth information. For example, the entire field of view may be surveyed in 3D within a single video frame, which in some embodiments may be within 1/60th of a second. In this way a very high speed 3D camera results that exceeds the speed of currently available 3D imaging devices by an order of magnitude.

Image processing component 1902 is responsive to a safety signal received from TOF measurement circuits and control component 1990. In operation, if TOF measurement circuits and control component 1990 determines that a safety violation exists, the safety signal is asserted and image processing component 1902 responds by reducing power levels to a safe level. In some embodiments, this results in no visible light emission until the safety violation is removed.

Figure 20:
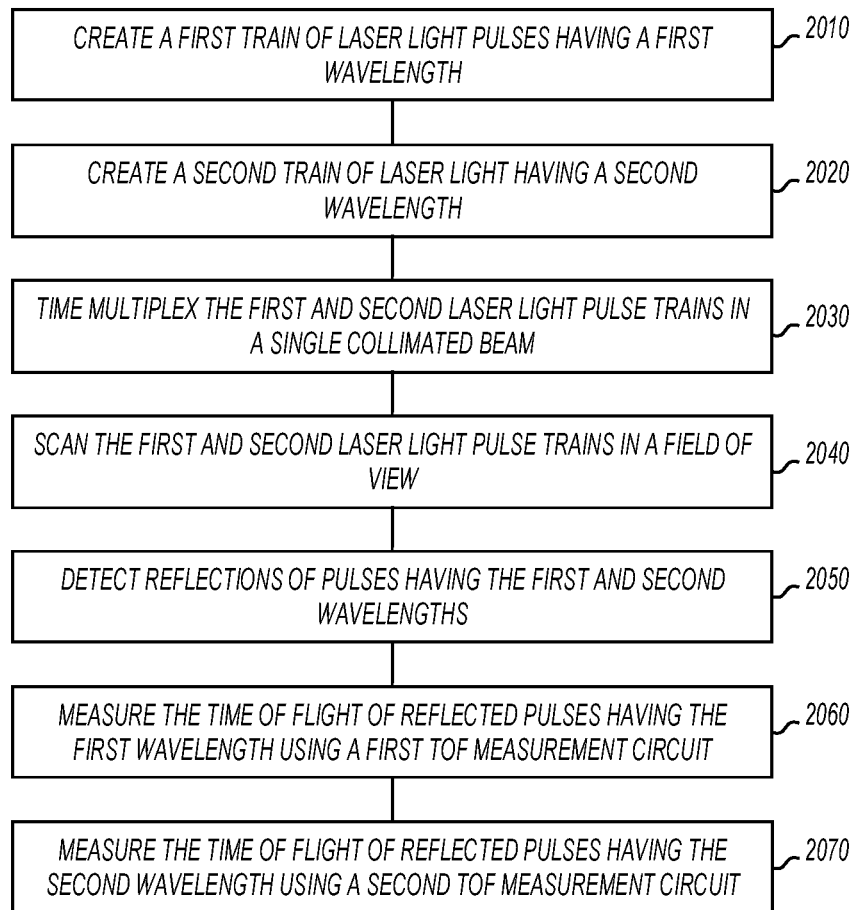
FIGS. 20-22 show flow diagrams of methods in accordance with various embodiments of the present invention.

FIG. 20 shows a flow diagram of methods in accordance with various embodiments of the present invention. In some embodiments, method 2000, or portions thereof, is performed by a 3D imaging system, embodiments of which are shown in previous figures. In other embodiments, method 2000 is performed by a series of circuits or an electronic system. Method 2000 is not limited by the particular type of apparatus performing the method. The various actions in method 2000 may be performed in the order presented, or may be performed in a different order. Further, in some embodiments, some actions listed in FIG. 20 are omitted from method 2000.

Method 2000 is shown beginning with block 2010. As shown at 2010, a first train of laser light pulses having a first wavelength is created. In some embodiments, each pulse in the first train of laser light pulses has an abrupt change in amplitude to aid in determining a time of flight as described with reference to the previous figures. For example, in some embodiments, the laser light pulses are triangular in shape. In other embodiments, the laser light pulses have a Gaussian shape, and in still further embodiments, each pulse in the first train of laser light pulses has a different shape. The various embodiments of the present invention are not limited by the pulse shape. The first train of laser light pulses may be produced by a laser light source such as laser light source 266 (FIG. 2), and may correspond to pulse train 710 (FIG. 7), pulse train 1410 (FIG. 14), or the like.

At 2020, a second train of laser light pulses having a second wavelength is created. In some embodiments, each pulse in the second train of laser light pulses has an abrupt change in amplitude to aid in determining a time of flight as described with reference to the previous figures. For example, in some embodiments, the laser light pulses are triangular in shape. In other embodiments, the laser light pulses have a Gaussian shape, and in still further embodiments, each pulse in the first train of laser light pulses has a different shape. The various embodiments of the present invention are not limited by the pulse shape. The second train of laser light pulses may be produced by a laser light source such as laser light source 268 (FIG. 2), and may correspond to pulse train 720 (FIG. 7), pulse train 1420 (FIG. 14), or the like.

At 2030, the first and second pulse trains are time multiplexed in a single collimated beam such as output beam 224 (FIG. 2). In some embodiments, more than two pulse trains of different wavelengths are created and time multiplexed in a single collimated beam. For example, in some embodiments, three or more pulse trains are time multiplexed.

At 2040, the first and second pulse trains are scanned in a field of view. This may correspond to the light pulses being reflected off scanning mirror 216 (FIG. 2), or may correspond to the light pulses being reflected off of a first single axis scanning mirror and then off a second single mirror scanning mirror. The scanning mirror scans such that the time multiplexed pulses of different wavelengths traverse a raster pattern (e.g., raster pattern 226).

At 2050, reflections of the laser light pulses from within the field of view are detected. Pulses of different wavelengths may be detected by different photodetectors. For example, pulses of a first wavelength $\lambda 1$ may be detected by a photodetector within a first TOF measurement circuit such as TOF measurement circuit 280 (FIG. 2), and pulses of a second wavelength $\lambda N$ may detected by a photodetector within a second TOF measurement circuit such as TOF measurement circuit 282 (FIG. 2) In some embodiments, N is greater than two, such that reflected pulses of three different wavelengths or more than three different wavelengths are detected.

At 2060, times of flight of reflected pulses having the first wavelength are measured using a first TOF measurement circuit, and at 2070, times of flight of reflected pulses having the second wavelength are measured using a second TOF measurement circuit. For example, times of flight of pulses in the first pulse train may be measured by TOF measurement circuit 280 (FIG. 2), and times of flight of pulses in the second pulse train may be measured by TOF measurement circuit 282 (FIG. 2). In embodiments with N greater than two, times-of-flight of additional pulses having different wavelengths are also measured.

In some embodiments, reflected pulses of a particular wavelength are received and measured by the same TOF measurement circuit. For example, reflected pulses with a wavelength of $\lambda 1$ may all be received and measured by TOF distance measurement circuit 280 (FIG. 2). In other embodiments, reflected pulses of a particular wavelength are received and measured by a plurality of TOF measurement circuits in a time multiplexed manner. For example, reflected pulses with a wavelength of $\lambda 1$ may all be received and measured by the plurality of TOF distance measurement circuits 1380 (FIG. 13).

Method 2000 may be repeated as the scanning mirror scans in one or two dimensions, thereby creating a 3D image of the object. The 3D image may be refreshed every repetition of the raster pattern, or less often.

Figure 21:
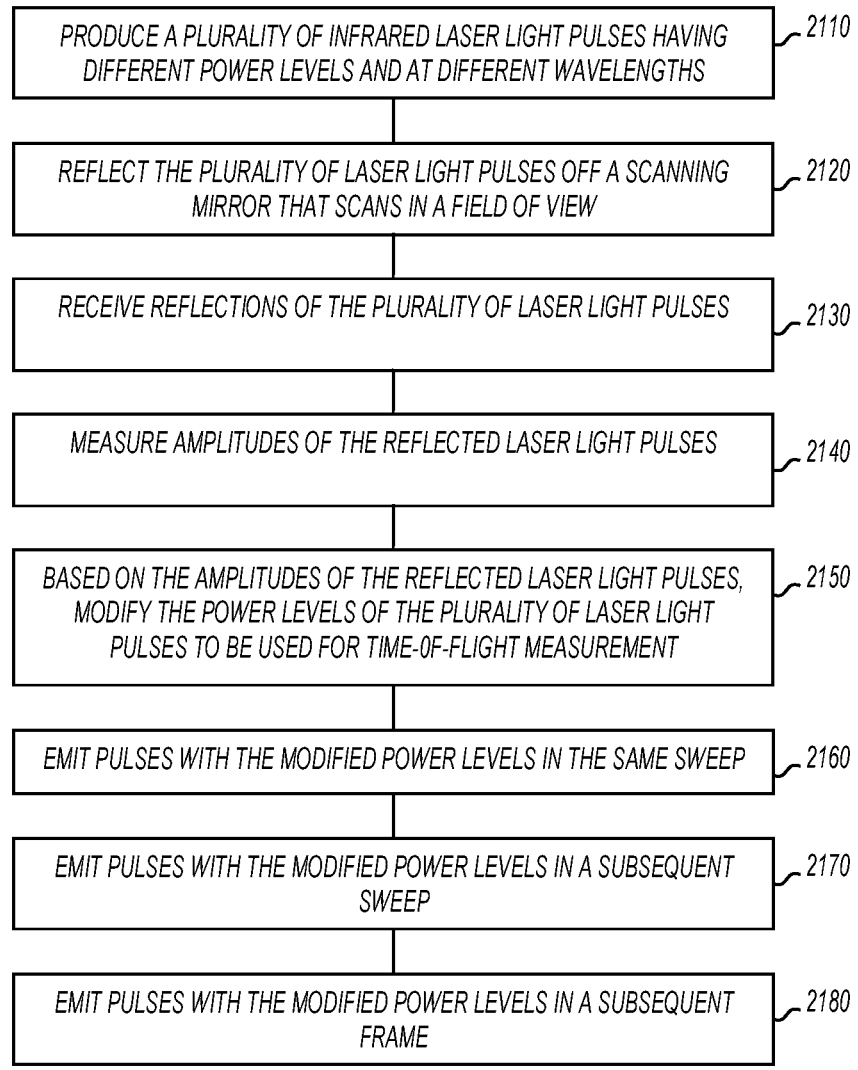

FIG. 21 shows a flow diagram of methods in accordance with various embodiments of the present invention. In some embodiments, method 2100, or portions thereof, is performed by a 3D imaging system, embodiments of which are shown in previous figures. In other embodiments, method 2100 is performed by a series of circuits or an electronic system. Method 2100 is not limited by the particular type of apparatus performing the method. The various actions in method 2100 may be performed in the order presented, or may be performed in a different order. Further, in some embodiments, some actions listed in FIG. 21 are omitted from method 2100.

Method 2100 is shown beginning with block 2110. As shown at 2110, a plurality of IR laser light pulses having different power levels and different wavelengths are produced. In some embodiments, this corresponds to creating probing pulses as discussed above with reference to FIGS. 16-18.

At 2120, the plurality of IR laser light pulses are reflected off a scanning mirror that scans in a field of view. This may correspond to the light pulses being reflected off scanning mirror 216 (FIG. 2), or may correspond to the light pulses being reflected off of a first single axis scanning mirror and then off a second single mirror scanning mirror. The scanning mirror scans such that the IR laser light pulses traverse a raster pattern (e.g., raster pattern 226).

At 2130, reflections of the IR laser light pulses from within the field of view are received. Pulses of different wavelengths may be detected by different photodetectors. For example, pulses of a first wavelength $\lambda 1$ may be detected by a photodetector within a first TOF measurement circuit such as TOF measurement circuit 280 (FIG. 2), and pulses of a second wavelength $\lambda N$ may detected by a photodetector within a second TOF measurement circuit such as TOF measurement circuit 282 (FIG. 2) In some embodiments, N is greater than two, such that reflected pulses of three different wavelengths or more than three different wavelengths are detected.

At 2140, the amplitudes of reflected IR laser light pulses are measured. In some embodiments, this corresponds to the operation of a peak detector such as peak detector 910 (FIGS. 9, 11), and in other embodiments, this corresponds to the operation of a pulse width measurement circuit such as pulse width measurement circuit 1010 (FIGS. 10, 12).

At 2150, power levels of subsequent pulses are modified based on the amplitudes of the reflected laser light pulses. For example, if one or more of the measured amplitudes detect a saturation condition in the receive path, then power levels may be set such that future pulses do not saturate the receive path. In some embodiments, the subsequent pulses with modified power levels are used for TOF measurement as described above.

In some embodiments, the TOF of the reflected IR laser light pulses is also measured, and an action taken in response thereto. For example, if a safety violation is detected, then the power levels of subsequent pulses may be reduced to a safe level until the safety violation is no longer detected.

At 2160, the subsequent IR laser light pulses with modified power levels are emitted in the same sweep. This is illustrated in FIG. 17 at 1710, 1720. At 2170, the subsequent IR laser light pulses with modified power levels are emitted in a subsequent sweep. This is illustrated in FIG. 17 at 1713, 1740. And at 2180, the subsequent IR laser light pulses with modified power levels are emitted in a subsequent raster scan, or "frame."

Figure 22:
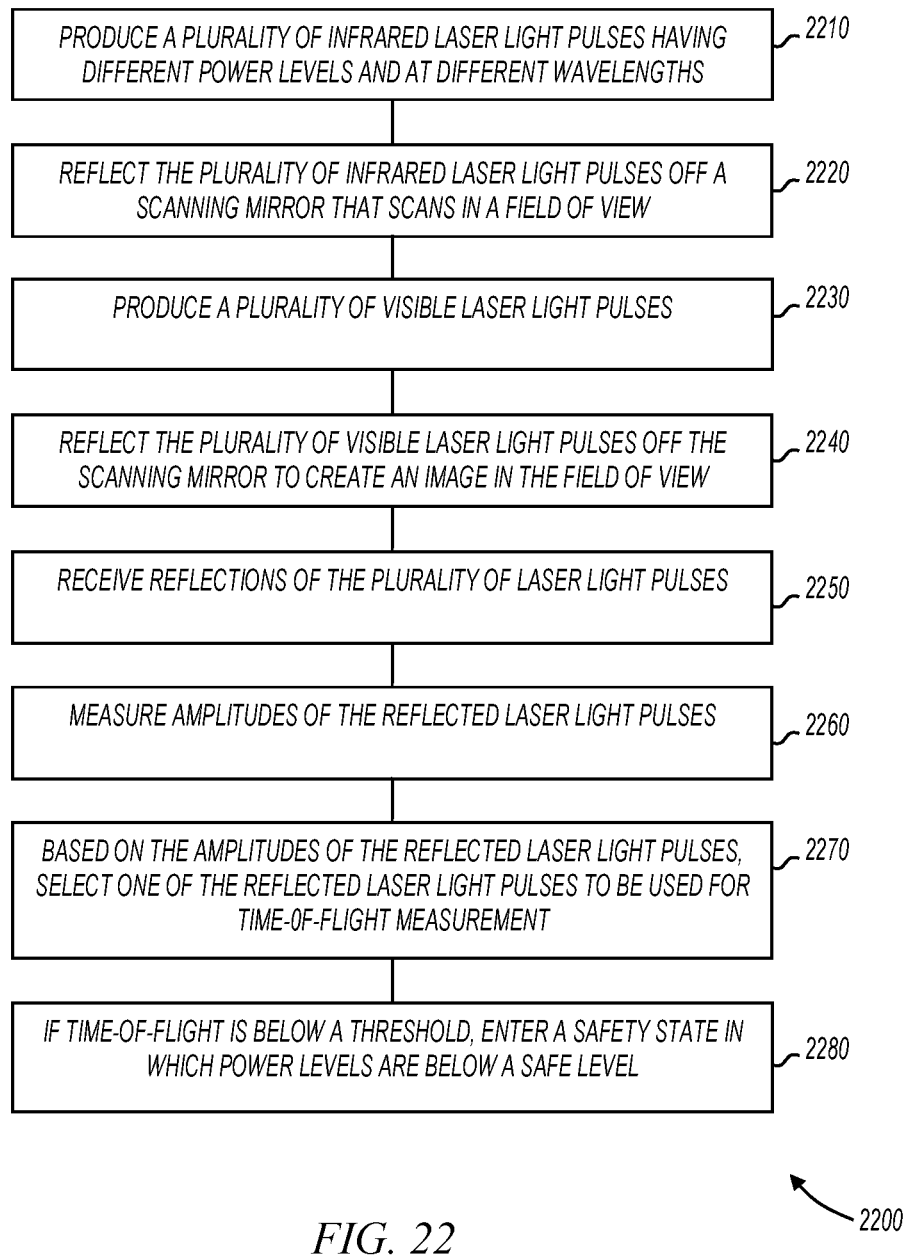

FIG. 22 shows a flow diagram of methods in accordance with various embodiments of the present invention. In some embodiments, method 2200, or portions thereof, is performed by a 3D imaging system, embodiments of which are shown in previous figures. In other embodiments, method 2200 is performed by a series of circuits or an electronic system. Method 2200 is not limited by the particular type of apparatus performing the method. The various actions in method 2200 may be performed in the order presented, or may be performed in a different order. Further, in some embodiments, some actions listed in FIG. 22 are omitted from method 2200.

Method 2200 is shown beginning with block 2210. As shown at 2210, a plurality of IR laser light pulses having different power levels and different wavelengths are produced. In some embodiments, this corresponds to creating probing pulses as discussed above with reference to FIGS. 16-18.

At 2220, the plurality of IR laser light pulses are reflected off a scanning mirror that scans in a field of view. This may correspond to the light pulses being reflected off scanning mirror 216 (FIG. 2), or may correspond to the light pulses being reflected off of a first single axis scanning mirror and then off a second single mirror scanning mirror. The scanning mirror scans such that the IR laser light pulses traverse a raster pattern (e.g., raster pattern 226).

At 2230, a plurality of visible laser light pulses are produced. In some embodiments, this corresponds to modulating red, green, and blue laser light pulses to create pixels in an image. For example, the actions of 2230 may be carried out by a 3D imaging system such as system 1900 (FIG. 19). At 2240, the plurality of visible laser light pulses are reflected off the scanning mirror that scans in the field of view.

At 2250, reflections of the IR laser light pulses from within the field of view are received. Pulses of different wavelengths may be detected by different photodetectors. For example, pulses of a first wavelength λ1 may be detected by a photodetector within a first TOF measurement circuit such as TOF measurement circuit 280 (FIG. 2), and pulses of a second wavelength λN may detected by a photodetector within a second TOF measurement circuit such as TOF measurement circuit 282 (FIG. 2) In some embodiments, N is greater than two, such that reflected pulses of three different wavelengths or more than three different wavelengths are detected.

At 2260, the amplitudes of reflected IR laser light pulses are measured. In some embodiments, this corresponds to the operation of a peak detector such as peak detector 910 (FIGS. 9, 11), and in other embodiments, this corresponds to the operation of a pulse width measurement circuit such as pulse width measurement circuit 1010 (FIGS. 10, 12).

At 2270, one of the reflected laser light pulses is selected to be used for time-of-flight measurement based on the amplitudes of the reflected IR laser light pulses. For example, in some embodiments, both the amplitude and TOF (Z) of reflected pulses are measured, and the Z value used for the distance measurement is a function of the amplitude values. Any criteria for amplitude values may be used in the selection of the Z value. For example, the amplitude values may be compared to each other, to a fixed threshold value, or the like.

At 2280, a safety state is entered if a safety violation is detected in which the measured TOF is below a threshold. The safety state is a state in which power levels are below a safe level. In some embodiments, power levels are set to zero in the safety state.

Figure 23:
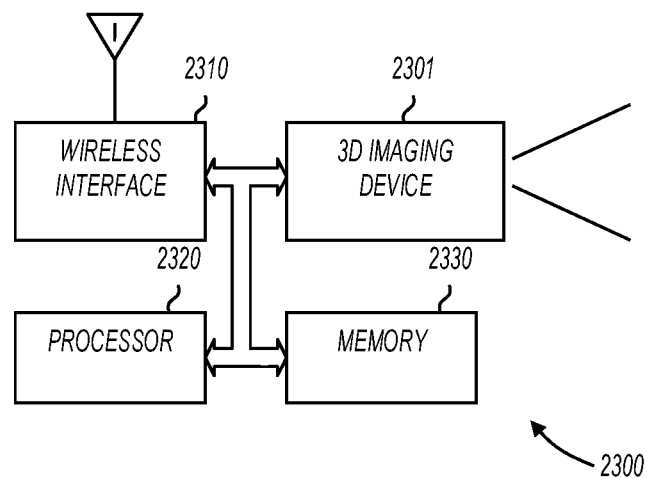
FIG. 23 shows a block diagram of a mobile device in accordance with various embodiments of the present invention.

FIG. 23 shows a block diagram of a mobile device in accordance with various embodiments of the present invention. As shown in FIG. 23, mobile device 2300 includes wireless interface 2310, processor 2320, memory 2330, and 3D imaging device 2301. 3D imaging device 2301 creates a 3D image by measuring the TOF of laser pulses as described above. 3D imaging device 2301 may include laser light sources to produce laser pulses with different wavelengths, and TOF measurement circuits to measure the TOF of pulses of different wavelengths as described herein. For example, 3D imaging device 2301 may include any of apparatus 200 (FIG. 2), apparatus 800 (FIG. 8), apparatus 1300 (FIG. 13), or apparatus 1500 (FIG. 15).

In some embodiments, 3D imaging device 2301 also includes a scanning projector. For example, 3D imaging device 2301 may include 3D imaging device 1900 (FIG. 19). In these embodiments, 3D imaging device 2301 may receive image data from any image source. For example, in some embodiments, 3D imaging device 2301 includes memory that holds still images. In other embodiments, 3D imaging device 2301 includes memory that includes video images. In still further embodiments, 3D imaging device 2301 displays imagery received from external sources such as connectors, wireless interface 2310, a wired interface, or the like.

Wireless interface 2310 may include any wireless transmission and/or reception capabilities. For example, in some embodiments, wireless interface 2310 includes a network interface card (NIC) capable of communicating over a wireless network. Also for example, in some embodiments, wireless interface 2310 may include cellular telephone capabilities. In still further embodiments, wireless interface 2310 may include a global positioning system (GPS) receiver. One skilled in the art will understand that wireless interface 2310 may include any type of wireless communications capability without departing from the scope of the present invention.

Processor 2320 may be any type of processor capable of communicating with the various components in mobile device 2300. For example, processor 2320 may be an embedded processor available from application specific integrated circuit (ASIC) vendors, or may be a commercially available microprocessor. In some embodiments, processor 2320 provides image or video data to 3D imaging device 2301. The image or video data may be retrieved from wireless interface 2310 or may be derived from data retrieved from wireless interface 2310. For example, through processor 2320, 3D imaging device 2301 may display images or video received directly from wireless interface 2310. Also for example, processor 2320 may provide overlays to add to images and/or video received from wireless interface 2310, or may alter stored imagery based on data received from wireless interface 2310 (e.g., modifying a map display in GPS embodiments in which wireless interface 2310 provides location coordinates).

Figure 24:
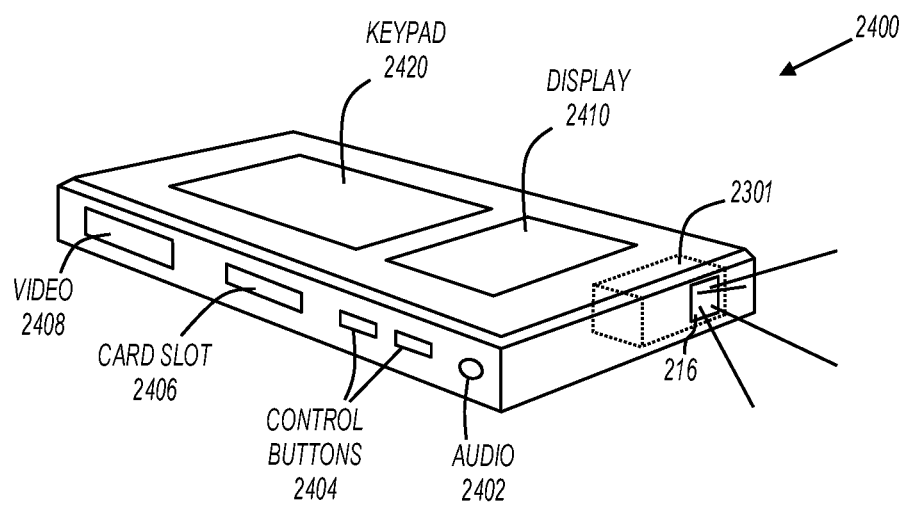
FIG. 24 shows a mobile device in accordance with various embodiments of the present invention.

FIG. 24 shows a mobile device in accordance with various embodiments of the present invention. Mobile device 2400 may be a hand held 3D imaging device with or without communications ability. For example, in some embodiments, mobile device 2400 may be a 3D imaging device with little or no other capabilities. Also for example, in some embodiments, mobile device 2400 may be a device usable for communications, including for example, a cellular phone, a smart phone, a tablet computer, a global positioning system (GPS) receiver, or the like. Further, mobile device 2400 may be connected to a larger network via a wireless or cellular connection, or this device can accept and/or transmit data messages or video content via an unregulated spectrum (e.g., WiFi) connection. Mobile device 2400 includes 3D imaging device 2301 to create 3D images. 3D imaging device 2301 may be any of the 3D imaging devices described herein.

Mobile device 2400 includes display 2410, keypad 2420, audio port 2402, control buttons 2404, card slot 2406, and video port 2408. None of these elements are essential. For example, mobile device 2400 may only include 3D imaging device 2301 without any of display 2410, keypad 2420, audio port 2402, control buttons 2404, card slot 2406, or video port 2408. Some embodiments include a subset of these elements. For example, an accessory projector product that includes 3D imaging capabilities may include 3D imaging device 800 (FIG. 8), control buttons 2404 and video port 2408.

Display 2410 may be any type of display. For example, in some embodiments, display 2410 includes a liquid crystal display (LCD) screen. Display 2410 may or may not always display the image captured by 3D imaging device 2301. For example, an accessory product may always display the captured image, whereas a mobile phone embodiment may capture an image while displaying different content on display 2410. Keypad 2420 may be a phone keypad or any other type of keypad. In some embodiments, keypad 2420 and display 2410 are combined in a touch screen display.

Video port 2408 accepts and/or transmits video and/or audio signals. For example, video port 2408 may be a digital port, such as a high definition multimedia interface (HDMI) that accepts a cable suitable to carry digital audio and video data. Further, video port 2408 may include RCA jacks to accept or transmit composite inputs. Still further, video port 2408 may include a VGA connector to accept or transmit analog video signals. In some embodiments, mobile device 2400 may be tethered to an external signal source through video port 2408, and mobile device 2400 may project content accepted through video port 2408. In other embodiments, mobile device 2400 may be an originator of content, and video port 2408 is used to transmit content to a different device.

Audio port 2402 provides audio signals. For example, in some embodiments, mobile device 2400 is a 3D media recorder that can record and play audio and 3D video. In these embodiments, the video may be projected by 3D imaging device 2301 and the audio may be output at audio port 2402.

Mobile device 2400 also includes card slot 2406. In some embodiments, a memory card inserted in card slot 2406 may provide a source for audio to be output at audio port 2402 and/or video data to be projected by 3D imaging device 2301. In other embodiments, a memory card inserted in card slot 2406 may be used to store 3D image data captured by mobile device 2400. Card slot 2406 may receive any type of solid state memory device, including for example, Multimedia Memory Cards (MMCs), and secure digital (SD) memory cards. The foregoing list is meant to be exemplary, and not exhaustive.

FIG. 25 shows a wearable 3D imaging system in accordance with various embodiments of the invention. In the example of FIG. 25, the wearable 3D imaging system 2500 is in the form of eyeglasses, but this is not a limitation of the present invention. For example, the wearable 3D imaging system may be a hat, headgear, worn on the arm or wrist, or be incorporated in clothing. The wearable 3D imaging system 2500 may take any form without departing from the scope of the present invention.

Wearable 3D imaging system 2500 includes 3D imaging device 2510. 3D imaging device 2510 creates a 3D image by measuring the TOF of laser pulses as described above. 3D imaging device 2510 may include a plurality of light sources and TOF measurement circuits for processing time multiplexed laser pulses of different wavelengths as described herein. For example, 3D imaging device 2510 may include any of apparatus 200 (FIG. 2), apparatus 800 (FIG. 8), apparatus 1300 (FIG. 13), or apparatus 1500 (FIG. 15). In some embodiments, 3D imaging device 2510 also includes a scanning projector. For example, 3D imaging device 2510 may include 3D imaging device 1900 (FIG. 19).

In some embodiments, wearable 3D imaging system 2500 provides feedback to the user that is wearing the system. For example, a head up display may be incorporated to overlay 3D images with data to create a virtual reality, an augmented reality. Further, tactile feedback may be incorporated in the wearable 3D imaging device to provide interaction with the user.

FIG. 26 shows a gaming apparatus in accordance with various embodiments of the present invention. Gaming apparatus 2600 includes buttons 2602, display 2610, and 3D imaging device 2301. In some embodiments, gaming apparatus 2600 is a standalone apparatus that does not need a larger console for a user to play a game. For example, a user may play a game while watching content displayed by 3D imaging device 2301 and/or display 2610. In other embodiments, gaming apparatus 2600 operates as a controller for a larger gaming console. In these embodiments, a user may watch a larger screen tethered to the console in combination with watching display 2610 and/or content projected by 3D imaging device 2301.

3D imaging devices described herein have many additional applications. For example, various embodiments of the present invention may be included in automobiles for the purposes of occupancy detection, sleep/gaze detection, gesture detection, interaction, communication, and the like. Also for example, various embodiments of the present invention may be included in cameras and security or surveillance devices such as home security devices, smart cameras, IP cameras, and the like.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
   a first laser light source to emit laser light pulses of a first wavelength;

a second laser light source to emit laser light pulses of a second wavelength;

at least one scanning mirror to reflect and scan the laser light pulses from the first and second laser light sources;

a first time-of-flight measurement circuit to receive reflections of, and to determine times-of-flight of, laser light pulses of the first wavelength, wherein the first time-of-flight measurement circuit exhibits a first processing time that influences a minimum pulse spacing of the laser light pulses of the first wavelength;

a second time-of-flight measurement circuit to receive reflections of, and to determine times-of-flight of, laser light pulses of the second wavelength, wherein the second time-of-flight measurement circuit exhibits a second processing time that influences a minimum pulse spacing of the laser light pulses of the second wavelength; and a pulse timing circuit to cause laser light pulses of the first and second wavelengths to be interleaved in time to decrease an effective minimum pulse spacing and increase spatial measurement resolution.

2. The apparatus of claim 1 wherein the first time-of-flight measurement circuit comprises:

a first photodetector to detect reflected laser light pulses of the first wavelength;

a first differentiator coupled to the first photodetector to differentiate detected pulses;

a first amplifier to receive differentiated detected pulses from the first differentiator and to generate first differential output signals;

a first detection circuit to detect when the first differential output signals cross each other; and a first integrator responsive to the first detection circuit for time measurement.

3. The apparatus of claim 2 wherein the second time-of-flight measurement circuit comprises:

a second photodetector to detect reflected laser light pulses of the second wavelength;

a second differentiator coupled to the second photodetector to differentiate detected pulses;

a second amplifier to receive differentiated detected pulses from the second differentiator and to generate second differential output signals;

a second detection circuit to detect when the second differential output signals cross each other; and a second integrator responsive to the second detection circuit for time measurement.

4. The apparatus of claim 1 wherein the first and second time-of-flight measurement circuits each include a comparator to compare a received pulse amplitude to a threshold.

5. The apparatus of claim 1 wherein the first and second laser light sources emit infrared light.

6. The apparatus of claim 5 further comprising:

at least one laser light source to produce laser light pulses in the visible spectrum; and image processing circuitry to modulate the at least one visible laser light source to display an image while measuring distance at multiple points in a field of view.

7. The apparatus of claim 1 further comprising a third laser light source to emit laser light pulses of a third wavelength.

8. An apparatus comprising:

a first laser light source to emit laser light pulses of a first wavelength;

a second laser light source to emit laser light pulses of a second wavelength;

a plurality of first time-of-flight measurement circuits to receive reflections of, and to determine times-of-flight of, laser light pulses of the first wavelength, wherein each of the plurality of first time-of-flight measurement circuits exhibits a first processing time that influences a minimum pulse spacing of the laser light pulses of the first wavelength;

a plurality of second time-of-flight measurement circuits to receive reflections of, and to determine times-of-flight of, laser light pulses of the second wavelength, wherein each of the plurality of second time-of-flight measurement circuits exhibits a second processing time that influences a minimum pulse spacing of the laser light pulses of the second wavelength; and a pulse timing circuit to cause laser light pulses of the first and second wavelengths to be interleaved in time to decrease an effective minimum pulse spacing and increase spatial measurement resolution.

9. The apparatus of claim 8 further comprising at least one scanning mirror to reflect and scan laser light pulses from the first and second laser light sources.

10. The apparatus of claim 9 wherein the first and second laser light sources emit light pulses in the nonvisible spectrum.

11. The apparatus of claim 10 wherein the first and second laser light sources emit infrared light of different wavelengths.

12. The apparatus of claim 10 further comprising at least one laser light source to produce light in the visible spectrum.

13. The apparatus of claim 12 further comprising image processing circuitry to drive the at least one laser light source to produce light in the visible spectrum to display an image with visible light while performing distance measurements with nonvisible light.

14. A 3D imaging device comprising:

a scanning mirror to scan first infrared laser light pulses having a first wavelength and second infrared laser light pulses having a second wavelength in at least one dimension, wherein the first and second infrared laser light pulses are interleaved in time;

a first time of flight distance measurement circuit to determine distances traveled by reflected infrared laser light pulses having the first wavelength, wherein the first time-of-flight distance measurement circuit exhibits a first processing time that influences a minimum pulse spacing of the laser light pulses of the first wavelength;

a second time of flight distance measurement circuit to determine distances traveled by reflected infrared laser light pulses having the second wavelength, wherein the second time-of-flight distance measurement circuit exhibits a second processing time that influences a minimum pulse spacing of the laser light pulses of the second wavelength; and a pulse timing circuit to cause the laser light pulses of the first and second wavelengths to be interleaved in time to decrease an effective minimum pulse spacing and increase spatial measurement resolution.

15. The 3D imaging device of claim 14 wherein the scanning mirror is configured to scan in two dimensions.

16. The 3D imaging device of claim 14 wherein each of the first and second time-of-flight distance measurement circuits comprises a photodetector, a differentiator, a cross point detector and an integrator.

17. The 3D imaging device of claim 14 wherein each of the first and second time-of-flight distance measurement circuits comprises a photodetector and a comparator to compare an amplitude of reflected infrared laser light pulses to a threshold.

18. The 3D imaging device of claim 17 further comprising at least one visible laser light source to produce visible laser light pulses.

19. The 3D imaging device of claim 18 further comprising image processing circuitry to drive the at least one visible laser light source to produce the visible laser light pulses to display an image with visible light while performing distance measurements with infrared light.

* * * * *